US012106126B2

(12) United States Patent
Geller et al.

(10) Patent No.: US 12,106,126 B2
(45) Date of Patent: Oct. 1, 2024

(54) CONVERSATIONAL ASSISTANT CONTROL OF A GRAPHICAL USER INTERFACE

(71) Applicant: R3 COLLABORATIVES, INC., San Francisco, CA (US)

(72) Inventors: Adam Joseph Geller, San Francisco, CA (US); Ross David Weldon, San Francisco, CA (US)

(73) Assignee: R3 Collaboratives, Inc., San Francisco, CA (US)

( * ) Notice: Subject to any disclaimer, the term of this patent is extended or adjusted under 35 U.S.C. 154(b) by 0 days.

(21) Appl. No.: 18/157,603

(22) Filed: Jan. 20, 2023

(65) Prior Publication Data
US 2023/0244506 A1    Aug. 3, 2023

Related U.S. Application Data

(60) Provisional application No. 63/305,464, filed on Feb. 1, 2022.

(51) Int. Cl.
*G06F 9/451*    (2018.01)
*G06F 3/0481*   (2022.01)
*G06N 5/022*    (2023.01)

(52) U.S. Cl.
CPC ............ *G06F 9/451* (2018.02); *G06F 3/0481* (2013.01); *G06N 5/022* (2013.01)

(58) Field of Classification Search
CPC ........ G06F 3/0481; G06F 9/451; G06N 5/022
See application file for complete search history.

(56) References Cited

U.S. PATENT DOCUMENTS

| 2001/0047626 | A1* | 12/2001 | Ohkado | H04M 3/5183 |
| | | | | 49/506 |
| 2011/0202502 | A1* | 8/2011 | Takatsu | G06Q 10/06 |
| | | | | 707/E17.008 |
| 2014/0281996 | A1* | 9/2014 | Paulraj | G11B 27/11 |
| | | | | 715/720 |
| 2018/0004732 | A1 | 1/2018 | Brunn et al. | |
| 2019/0121801 | A1 | 4/2019 | Jethwa et al. | |
| 2020/0097247 | A1 | 3/2020 | Molina et al. | |

OTHER PUBLICATIONS

International Searching Authority, International Search Report and Written Opinion for International Application No. PCT/US 22/40571, mailed Dec. 20, 2022, 12 pages.

* cited by examiner

*Primary Examiner* — Eric J. Bycer
(74) *Attorney, Agent, or Firm* — Baker Botts L.L.P.

(57) ABSTRACT

A computer system generates and transmits one or more first presentation instructions which when rendered cause displaying one or more machine-generated messages of a conversational assistant in a first window of a graphical user interface (GUI) and cause displaying at least one other GUI element in the GUI. The computer system receives an input via the first window and processes one or more comments represented in the input to determine a task responsive to the one or more comments. Based on the task, the computer system generates and transmits one or more second presentation instructions which when rendered cause updating one or more of the first window and the other GUI element. The computer system repeats the generating, transmitting, receiving, processing, and updating steps to control the first window and the other GUI element based on a programmed workflow.

34 Claims, 14 Drawing Sheets

FIG. 6

CONVERSATIONAL ASSISTANT CONTROL OF A GRAPHICAL USER INTERFACE

BENEFIT CLAIM

This application claims the benefit under 35 U.S.C. § 119(e) of provisional application 63/305,464, filed Feb. 1, 2022, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © R3 Collaboratives Inc. 2021-2023.

TECHNICAL FIELD

One technical field of the present disclosure is computer-implemented, automated online conversational assistants and chatbots. Another technical field is automated control of elements of a graphical user interface.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graphical user interfaces also are widely used in some applications. Graphical user interfaces can display windows, panels, overlays, menus, and control widgets. Graphical user interfaces can display a variety of content such as text, tables of data, images, animations, and video players. Chatbots and other forms of online automated conversation systems have become widely available for use in a variety of applications including merchant websites. In the typical use, a chatbot conducts an automated, online conversation with an end user, via a browser, which ultimately results in providing information to the end user and/or accomplishing discrete tasks to manipulate or modify data in minor ways. However, to date, the interactions of a chatbot process with the end user or the browser or graphical user interface of the end user's computer have been limited. Chatbot processes typically run as independent threads and are displayed as popups or adjunct elements in relation to the rest of the graphical user interface, lacking a functional connection to the interface.

SUMMARY

The appended claims may serve as a summary of the invention. Herein, a human natural language may be understood as a language spoken by and/or used (e.g. in writing) by humans as they communicate with one another.

The disclosure specifically encompasses various embodiments including those of the following enumerated clauses:

1. A computer-implemented method comprising: using a first computer, generating and transmitting to a second computer, one or more first presentation instructions which when rendered using the second computer cause displaying one or more machine-generated messages of a conversational assistant in a first window of a graphical user interface, GUI, of the second computer, and cause displaying at least one other GUI element in the GUI; using the first computer, receiving, via the first window, input from the second computer; using the first computer, processing one or more comments represented in the input to determine a task responsive to the one or more comments, and based on the task, generating and transmitting to the second computer, one or more second presentation instructions which when rendered using the second computer cause updating one or more of the first window and the other GUI element; repeating the generating, transmitting, receiving, processing, and updating steps to control the first window and the other GUI element based on a programmed workflow that is stored at the first computer.

2. The method of clause 1, the first presentation instructions specifying a prompt to a user to set a goal.

3. The method of clause 1, the second presentation instructions specifying a request to enter a plurality of comments or tags.

4. The method of clause 1, the other GUI element comprising any of a video player window, a calendar window, a comments window.

5. The method of clause 1, the updating comprising replacing the first window with the other GUI element.

6. The method of clause 5, the repeating comprising restoring the conversational assistant to the first window.

7. The method of clause 1, further comprising: suspending the workflow and storing the input in association with the metadata describing the workflow; generating a summary of the metadata describing the workflow; automatically transmitting final presentation instructions to the client computing device, which when rendered via the client computing device, cause displaying the summary of the metadata describing the workflow.

8. The method of clause 1, the first presentation instructions causing displaying plurality of selectable options, and the method further comprising: determining a threshold corresponding to the input from the second computer selecting one of the plurality of selectable options; in response to determining that the input satisfies the threshold, generating the second presentation instructions to enable one or more second selectable options for suspending the workflow.

9. The method of clause 1, further comprising: in response to receiving the input, translating, by a natural-language module of a conversational assistant system, the input into a corresponding intent; retrieving, from a conversational knowledge graph, context of the corresponding intent; generating a natural-language response at the second computer.

10. The method of clause 1, the input comprising a plurality of comments corresponding to a video recording that is displayed in the other GUI element, each comment of the plurality of comments corresponding to one or more time values related to the video recording.

11. A computer-implemented method, as shown and described.

12. A computer-implemented method, as shown and described in any one or more paragraphs of the disclosure.

13. A computer-implemented method, as shown and described in any one or more drawing figures of the disclosure.

14. One or more non-transitory computer-readable storage media storing one or more sequences of instructions which, when executed using one or more processors, cause the processors to execute the method of any of clauses 1 to 13.

15. A computer system, comprising: one or more hardware processors; one or more non-transitory computer-readable storage media storing one or more sequences of instructions which, when executed using one or more processors, cause the processors to execute the method of any of clauses 1 to 13.

16. A computer-implemented method comprising: using a first computer, generating and transmitting to a second computer, one or more first output instructions which when processed using the second computer cause communicating one or more machine-generated messages of a conversational assistant; using the first computer, receiving input from the second computer comprising one or more comments in a human natural language; using the first computer, processing the one or more comments of the input to determine a task responsive to the one or more comments, and based on the task, generating and transmitting to the second computer, one or more second output instructions which when processed using the second computer cause updating at least one graphical user interface, GUI, element in a first window of the second computer; repeating the generating, transmitting, receiving, processing, and updating steps to control the first window and the GUI element based on a programmed workflow that is digitally stored at the first computer.

17. The method of clause 16, the first output instructions specifying a prompt to a user to set a goal.

18. The method of clause 16, the GUI element comprising any of a video player window, a calendar window, a comments window.

19. The method of clause 16, the updating comprising replacing the first window with the GUI element.

20. The method of clause 19, the repeating comprising restoring the conversational assistant to the first window.

21. The method of clause 16, further comprising: suspending the workflow and storing the input in association with the metadata describing the workflow; generating a summary of the metadata describing the workflow; automatically transmitting final output instructions to the client computing device, which when rendered via the client computing device, cause displaying the summary of the metadata describing the workflow.

22. The method of clause 16, the first output instructions causing displaying plurality of selectable options, and the method further comprising: determining a threshold corresponding to the input from the second computer selecting one of the plurality of selectable options; in response to determining that the input satisfies the threshold, generating the second output instructions to enable one or more second selectable options for suspending the workflow.

23. The method of clause 16, further comprising: in response to receiving the input, translating, by a natural-language module of a conversational assistant system, the input into a corresponding intent; retrieving, from a conversational knowledge graph, context of the corresponding intent; generating a natural-language response at the second computer.

24. The method of clause 16, the input comprising auditory comments in a human natural language.

25. The method of clause 16, the first output comprising one or more auditory messages in a human natural language.

Embodiments provide computer-implemented methods of operating a conversational assistant or chatbot and controlling elements of a graphical user interface based upon input received in an online conversation. In one aspect, the disclosure provides a computer-implemented method of using a first computer, generating and transmitting to a second computer, one or more first presentation instructions which when rendered using the second computer cause displaying one or more machine-generated messages of a conversational assistant in a first window of a graphical user interface (GUI) of the second computer, and cause displaying at least one other GUI element in the GUI; using the first computer, receiving, via the first window, input from the second computer; using the first computer, processing one or more comments represented in the input to determine a task responsive to the one or more comments, and based on the task, generating and transmitting to the second computer, one or more second presentation instructions which when rendered using the second computer cause updating one or more of the first window and the other GUI element; and repeating the generating, transmitting, receiving, processing, and updating two or more times to control the first window and the other GUI element based on a programmed workflow that is stored at the first computer.

In this manner, a chatbot or other conversational assistant can be programmed to control, according to a programmed workflow, tasks, or other instructions, the presentation of specific other GUI elements such as windows, video players, informational displays, interactive commenting facilities, and any other GUI widget or element that is useful in an automated workflow. Furthermore, the programmed workflow can cause replacing a first window, which displays the chatbot or conversational assistant, with other information displays, windows, or widgets, then restoring the chatbot or conversational assistant to continue a conversation with the second computer. Additionally, a chatbot or other conversational assistant may be programmed to perform discrete tasks to modify data and the presentation of specific GUI elements according to a programmed workflow, tasks, or other instructions.

As examples, an online conversation between a stored program and a human end user, via a browser, can drive or cause, under program control, instantiation or removal of windows of a graphical user interface, resizing of windows, creation of menus, replacement of a sub panel showing the conversational assistant with other windows, panels, or information, adding or removing a video player or other interface element, adding or removing windows or panels related to or linked to the video player or other interface element, changes in prompts within the conversational assistant, and a variety of other control operations.

With the methods and systems of this disclosure, the problems specified in the Background are overcome, and the operation of computers is transformed in a manner that is far more interactive and efficient; the end user can undertake a conversation with an avatar, persona, or other representation of a stored program and, as the conversation proceeds, interact with a variety of different user interface elements that are appropriate to the context of the conversation and/or its content.

Certain video review systems have been deployed in the educational setting for the purpose of recording teachers teaching in classrooms, after which supervisors, peers, or trainers may create and store comments about a particular teacher's teaching techniques in association with playing back segments of the recording. Review of video footage of teachers in the classroom is an important tool for the performance evaluation of teachers. However, there is a need for a platform or application that allows a teacher to review themselves in the absence of supervisors, peers, or trainers. Without appropriate tools, the teacher may find that conducting a review on their teaching without structure or guidance to be cumbersome and places a high cognitive load on the teacher. Thus, there is a need for an evaluation system that provides the teacher with a structured method of reviewing footage of themselves teaching in a classroom. Certain embodiments are described in this document in relation to video review systems that are useful in the educational context, but video review and education are only example domains with which the techniques of this disclosure may be useful. Thus, video review for teachers or in education is described for purposes of illustrating one clear example, but not to limit or constrain the scope of the disclosure.

The systems and methods described herein present several advantages. For example, and without limitation, certain education-focused embodiments may be operable to expand the capabilities of a conversational assistant through automated control of a GUI, provide feedback to users, elicit user thinking by prompting the user with a generated question, curate content for relevancy, assist in user self-observation and action planning, manage user behavior, generate a clock-hours certificate to verify user activity, and/or adapt one or more aspects of a curriculum to align with one or more aspects of a user (for example, culture). As one skilled in the pertinent art and with the benefit of the present disclosure would understand, the advantages disclosed in this paragraph are non-exhaustive and non-limiting.

BRIEF DESCRIPTION OF THE DRAWINGS

In the drawings:

FIG. 6 illustrates an example display of a graphical user interface depicting recording tips.

DETAILED DESCRIPTION

Figure 1:
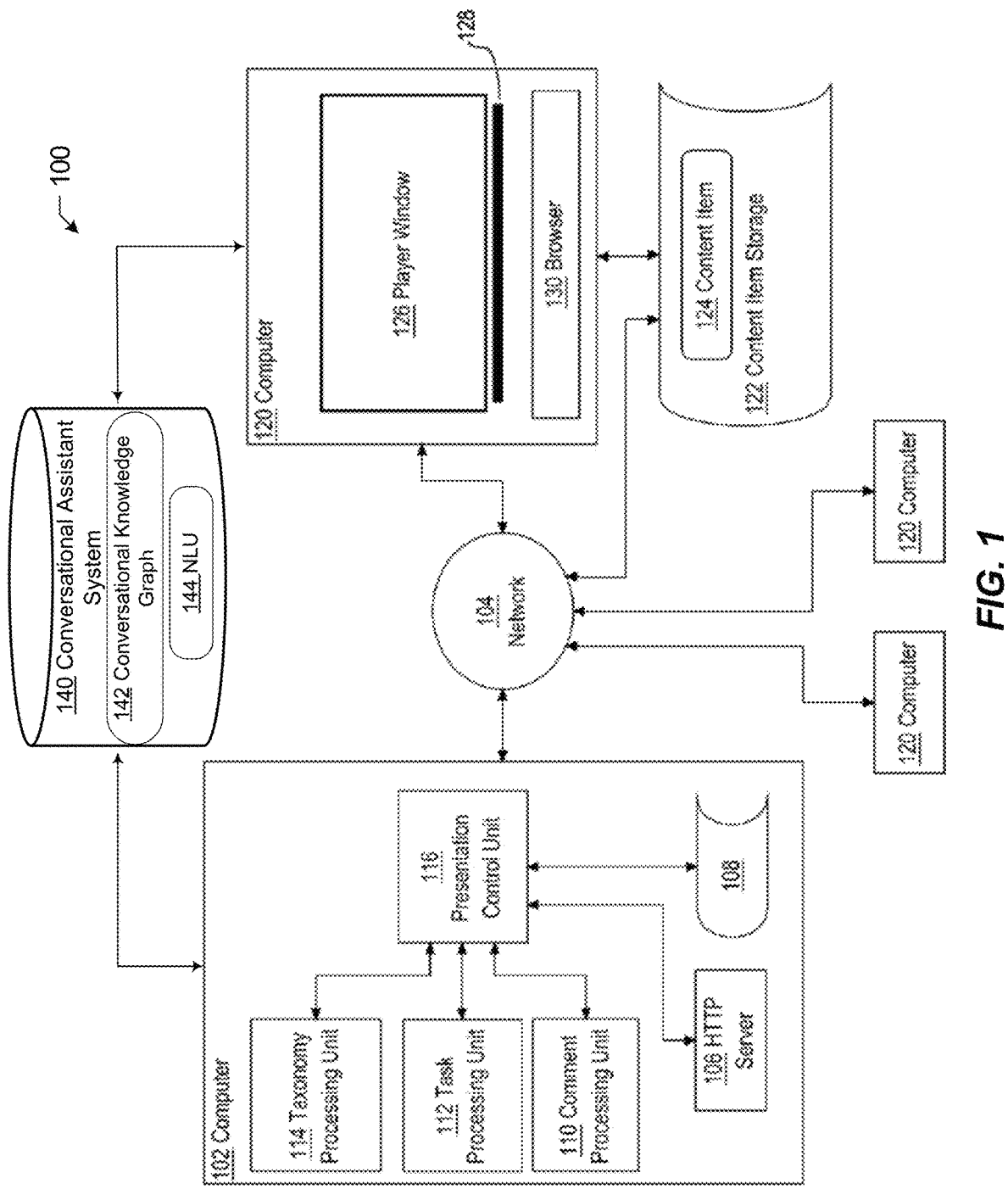
FIG. 1 illustrates an example networked computer system showing the context of use and principal functional elements with which one embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

As used herein, the term "coupled" should be understood to include any direct or indirect connection between two things, including, and without limitation, a physical connection (including, and without limitation, a wired or mechanical connection), a non-physical connection (including, and without limitation, a wireless connection), a fluid connection (including, and without limitation, a connection allowing for fluid communication), or any combination thereof. Furthermore, the words "comprising" (and any form of comprising, such as "comprise" and "comprises"), "having" (and any form of having, such as "has" and "have"), "including" (and any form of including, such as "includes" and "include") or "containing" (and any form of containing, such as "contains" and "contain") are to be understood as inclusive and open-ended and do not exclude additional, unrecited elements or method steps. Additionally, the terms "window" and "windows" are to be understood as meaning one or more graphical control elements displayable to a user; for the purposes of this disclosure, graphical control elements that are capable of being viewed but are not presently viewed (e.g., a minimized window) still fall within the scope of the terms "window" and "windows."

The present disclosure describes several embodiments using one or more browsers. It is to be understood that all embodiments utilizing a browser could be utilized with installed software. The term "browser" and "browsers," as used herein, describe one or more interfaces that allow a user to interact with digital content and that, at one point (e.g., installation), required a device to access a network. Furthermore, as used herein, the terms "computer" and "computers" describe one or more electronic devices for storing and/or processing data. The terms "computer" and "computers" include, but are not limited to, personal computers ("PCs"), mobile devices, routers, and other smart devices.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs, and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
 1. Structural & Functional Overview
 2. Implementation Example—Hardware Overview 1. Structural & Functional Overview FIG. 1 illustrates an example networked computer system showing the context of use and principal functional elements with which one embodiment may be implemented. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, a first computer 102 can be coupled to one or more second computers 120 directly or indirectly via one or more networks 104. In general, first computer 102 acts as an application server and the second computers 120 are clients. For purposes of illustrating a clear example, a limited number of second computers 120 are shown in FIG. 1, but in other embodiments an arbitrary number of second computers may be used. Although FIG. 1 discloses the use of a first computer 102 and a second computer 120, computer 120 may perform any and all of the functionalities as computer 102. In particular embodiments, computer 120 may locally include taxonomy processing unit 114, task processing unit 112, comment processing unit 110, presentation control unit 116, HTTP server 106, and storage 108.

Network 104 broadly represents any combination of one or more of a local area network (LAN), wide area network (WAN), campus network, or internetwork, using any of terrestrial or satellite links and/or wired or wireless links, and may include the public internet.

Computer 120 executes or hosts a browser 130, which may display one or more static and/or dynamic HTML documents and other data that the browser is capable of receiving over a protocol such as HTTP and rendering in a display unit of the computer 120. In an embodiment, as further described in other sections herein, browser 130 receives HTML documents and related data from computer 102 and renders a player window 126 in a display unit of the computer 120. In an embodiment, a linear graphical timeline 128 is also rendered in the display unit near the player window 126. Computer 120 also is coupled to content item storage 122, which contains a content item 124. In various embodiments, content item storage 122 is locally coupled to computer 120, or the content item storage 122 is coupled to the network 104 and may not be owned or operated by the owner or operator of the computer 120. For example, content item storage 122 could be a video storage site that is accessible via the public internet and located in a third party data center, cloud service provider, or part of a third party commercial service. Content item storage 122 also could be owned, operated, managed or maintained by an institution, such an enterprise, a government entity such as a school district or county board of education, or any other suitable entity. In some embodiments, content item storage 122 may be co-located with computer 102 and owned or operated by the same entity that controls the computer 102.

Computer 102 comprises, in one embodiment, an HTTP server 106 and storage 108 coupled to a presentation control unit 116. A comment processing unit 110, task processing unit 112, and taxonomy processing unit 114 are coupled to the presentation control unit 116. In an embodiment, the HTTP server 106 is configured to serve static and/or dynamic HTML documents, and other content or data that can be served over HTTP, via network 104 to a compatible client such as browser 130 of computer 120. Storage 108 comprises a relational database, object database, and/or file server and/or other data repository for files and data that are used transiently or persistently by the other elements of computer 102.

In an embodiment, the comment processing unit 110 is configured to receive comment types and comment text, or other comment data items, associated with comments on a video program and to associate and store the comment types and comment text in storage 108 in a record that identifies the video program. Specific techniques for performing these functions are further described in other sections herein.

In an embodiment, the task processing unit 112 is configured to generate data that can be rendered at browser 130 to cause displaying the timeline 128 with particular icons, colors, graphics, or other elements of a distinctive appearance. Specific techniques for performing these functions are further described in other sections here.

In an embodiment, taxonomy processing unit 114 is configured to manage one or more taxonomies, each having a plurality of categories, and to receive taxonomy input that identifies a taxonomy and a category with which the content item 124 is associated. Specific techniques for performing these functions are further described in other sections here.

In an embodiment, presentation control unit 116 is configured to control interactions of the computer 120 with other elements of computer 102 and to implement applications, services, or features of a video program commenting service. For example, presentation control unit 116 may be configured to manage client accounts, receive and cause authentication of client security credentials, receive and store metadata relating to particular videos, control the taxonomy processing unit 114 to obtain a definition of one or more taxonomies and categories for association with the content item 124, control the comment type processing unit to respond to requests to associate client comments with records in the storage 108, and control the task processing unit 112 to cause displaying or redisplaying the timeline 128 using distinct appearances or indicia associated with comments and other data. Specific techniques for performing these functions are further described in other sections here.

In an embodiment, the conversational assistant system 140 is programmed to communicate with computer 102 and/or computer 120. Conversational assistant system 140 may include a conversational knowledge graph 142 and natural language understanding (NLU) module 144. In an embodiment, computer 102 may provide instructions to browser 130 at computer 120 to display a prompt to display a plurality of selectable options or an editable text field. In this example, in response to the input prompt, a client may provide input from a keyboard, pointing device, and/or touchscreen of computer 120, in which the client input may be sent to NLU module 144. As an example and not by way of limitation, NLU module 144 may analyze the client input and identify a client intent, which may indicate a purpose of a client interacting with the conversational assistant system 140. An intent may be an element in a pre-defined taxonomy of intentions stored in storage 108 and categorized in taxonomy processing unit 114 of computer 102. In this example, a client selecting a goal of "check for understanding" within the coaching cycle may be processed by taxonomy processing unit 114 and output to the conversational assistant system 140 to produce the next set of outputs in the coaching cycle workflow corresponding to the client's intent of checking for understanding.

As an example and not by way of limitation, presentation control unit 116 may be configured to receive and store metadata relating to client input and control the taxonomy of the taxonomy processing unit 114 to obtain a definition of one or more taxonomies and categories for association with a video program presented in player window 126. The player window 126 may form one element of a graphical user interface (GUI) that is rendered using browser 130 and displayed at computer 120; the GUI can include other elements such as panels, sub windows, and widgets, any one or which may be subject to control by the conversational assistant system 140 as further described in other sections.

In an embodiment, the output of the NLU module 144 may conduct on-device or remote server learning that is based on a machine learning algorithm tailored for the client of computer 120. According to an embodiment, when a client provides input in browser 130 at the second computer 120, computer 120 may send a machine learning configuration file, a training dataset, and the input file to the conversational assistant system 140. The conversational assistant system 140 may configure a machine learning system using the machine learning configuration file, train the machine learning system, and send an output dataset back to computer 120 for display in browser 130.

As another example and not by way of limitation, federated learning may be used by the conversational assistant system 140 to produce conversational output. As used herein, "federated learning" is a specific category of distributed machine learning approaches which trains machine learning models using decentralized data residing on end devices such as mobile phones, or computer 120. In an embodiment, the conversational assistant system 140 may use a particular federated learning model to extend existing neural network techniques to personalize models in federated learning by learning task-specific client intent.

In an embodiment, conversational knowledge graph 142 may process natural-language input from NLU module 144 and retrieve conversational knowledge stored by the conversational knowledge graph 142 to customize real-time responses to client input. As an example and not by way of limitation, conversational knowledge graph 142 may combine input from NLU module 144 and other applications executing on computer 102 and/or 120 to execute a machine learning algorithm and update the conversational knowledge graph 142 based on the executed machine learning algorithm. It is understood that conversational knowledge graph 142 may be communicatively coupled to both computer 102 and computer 120.

In an embodiment, each of the processes described in connection with the functional units of FIG. 1 may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations of the processes, functions and functional units described herein, and the disclosure is not intended to preempt the use of other practical implementations of the processes and functions herein using means other than computers.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

Figure 2:
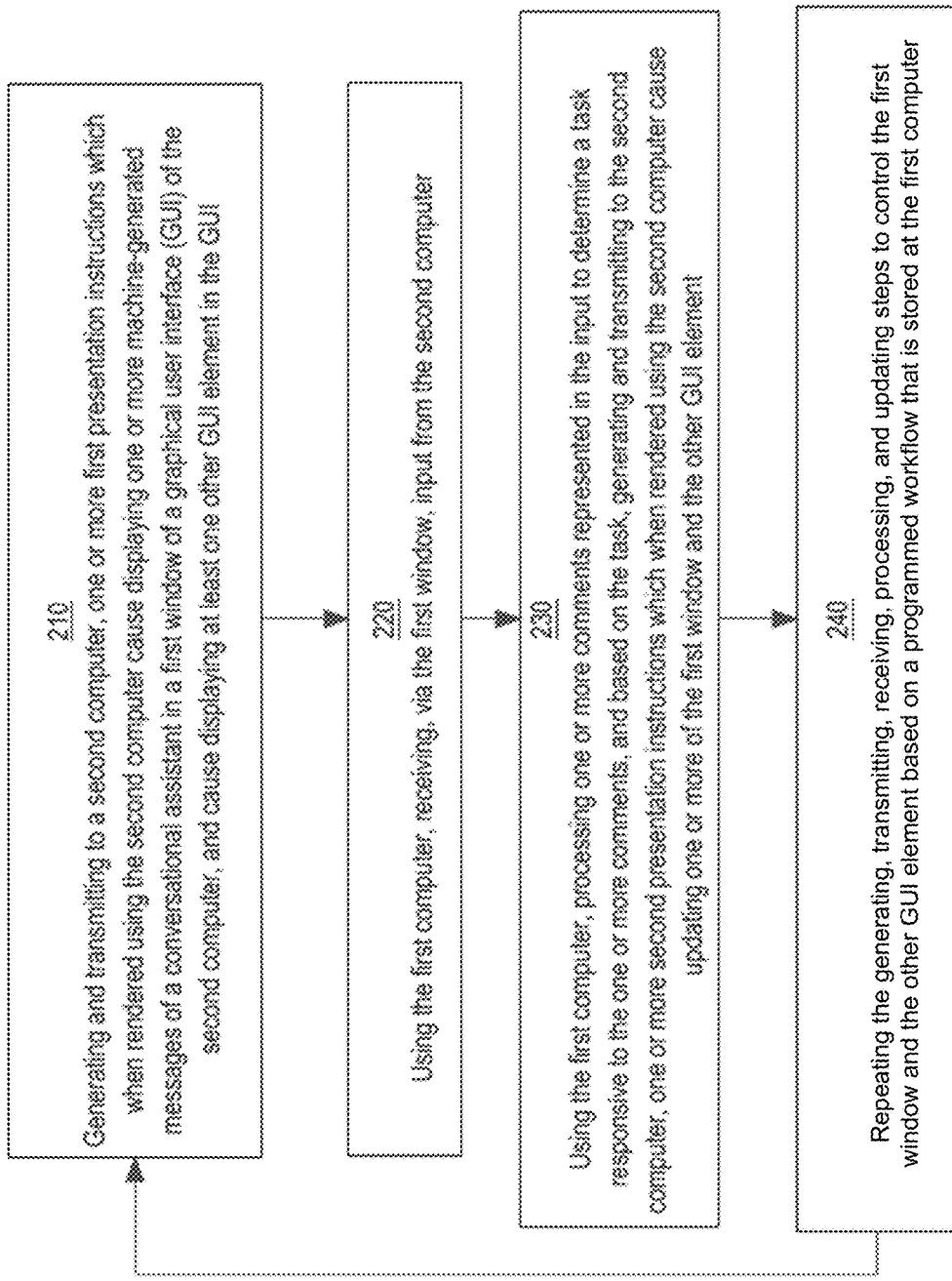
FIG. 2 illustrates an example data processing method according to an embodiment.

FIG. 2 illustrates an example data processing method according to an embodiment. FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, each of the functions described in connection with the blocks of FIG. 2 may be implemented using one or more computer programs, other software elements, and/or digital logic in any of a general-purpose computer or a special-purpose computer, while performing data retrieval, transformation and storage operations that involve interacting with and transforming the physical state of memory of the computer. The disclosure herein is directed to computer implementations of the processes, functions and functional units described herein, and the disclosure is not intended to preempt the use of other practical implementations of the processes and functions herein using means other than computers. For purposes of illustrating a clear example, the description of FIG. 2 is given with reference to FIG. 1. Other embodiments may be implemented in other contexts. Additionally, although FIG. 2 discloses the blocks operating in a particular order, this disclosure contemplates any suitable order of execution.

In an embodiment, the process may begin at block 210, where using a server computer that is communicatively coupled via one or more networks 104 to a client computing device, the process is programmed for generating and transmitting to a second computer, one or more first presentation instructions which when rendered using the second computer cause displaying one or more machine-generated messages of a conversational assistant in a first window of a graphical user interface (GUI) of the second computer, and cause displaying at least one other GUI element in the GUI. The first presentation instructions may be transmitted to the client computing device. As an example and not by way of limitation, the presentation instructions may be rendered via the client computing device to cause visually displaying a workflow of tasks in a display device of the client computing device. As another example and not by way of limitation, the presentation instructions may be rendered via the client computing device to cause visually displaying a first input prompt in a display device of the client computing device. In this example, the first input prompt may comprise a graphical widget having a plurality of selectable options. In an embodiment, block 210 involves the first computer 102 providing instructions to browser 130 at the second computer 120 to initiate rendering the presentation instructions, displaying a workflow of tasks, and visually displaying the first input prompt. In an embodiment, block 210 may involve the second computer 120 providing instructions to browser 120 on the second computer 120 to initiate rendering the presentation instructions, displaying a workflow of tasks, and visually displaying the input prompt. It is understood that any function performed on computer 102 may also be performed on computer 120.

In an embodiment, at block 220 the process is programmed for receiving, via the first window, input from the second computer. As an example and not by way of limitation, the second computer 120 may detect input from a keyboard, pointing device, or touchscreen of the second computer 120. As another example and not by way of limitation, the input may include a click, tap, touch, or other signal.

In an embodiment, at block 230, based on the first input prompt, the method may be programmed for processing one or more comments represented in the input to determine a task responsive to the one or more comments, and based on the task, generating and transmitting to the second computer, one or more second presentation instructions which when rendered using the second computer cause updating one or more of the first window and the other GUI element. As another example and not by way of limitation, the second input prompt may comprise an editable text box widget. In an embodiment, block 230 involves the first computer 102 providing instructions to browser 130 at the second computer 120 to initiate displaying the second input prompt. The instructions may be in machine executable code in the instruction set of a CPU and may have been compiled based upon source code written in JAVA, PYTHON, C, C++, OBJECTIVE-C, or any other suitable human-readable programming language or environment, alone or in combination with scripts in JAVASCRIPT, other scripting languages, and other programming source text.

At block 240 and as indicated by lines and arrows specifying a loop path, the method may be programmed for repeating the generating, transmitting, receiving, processing, and updating two or more times to control the first window and the other GUI element based on a programmed workflow that is stored at the first computer. As an example and not by way of limitation, at block 240, the method may be programmed for repeating the generating, transmitting, receiving, processing, and updating steps to control the first window and the other GUI element based on a programmed workflow that is stored at the first computer.

Optionally, in some embodiments, the method can be programmed for evaluating the input using a trained machine learning classifier and outputting a result set of one or more universal resource locator ("URL") links to one or more online resources. As an example and not by way of limitation, conversational assistant system 140 may store a first set of configuration files for building a Naïve Bayes classifier. As another example and not by way of limitation, the conversational assistant system 140 may additionally store a second set of configuration files for building a Long Short Term Memory (LSTM) neural network. In an embodiment, the dataset of the first and second inputs and one or more particular configuration files for building a particular machine learning system may be sent from computer 120 to conversational assistant system 140. The one or more particular configuration files may comprise instructions which, when executed, cause the input to pass through NLU module 144, conversational knowledge graph 142, and produce output for display at browser 130 of computer 120. As an example and not by way of limitation, probability values may be associated with each of the links. In an embodiment, block 250 involves the first computer 102 providing instructions to browser 130 at the second computer 120 to initiate display of the one or more URL links in the player window 126. The instructions may take the form of browser-executable code in JAVASCRIPT or a similar language.

Additionally in some embodiments, the process may transmit presentation instructions to the client computing device, which when rendered via the client computing device cause displaying one or more of the URL links that are associated with probability values that are above a specified minimum probability value. In an embodiment, the process is programmed for the first computer 102 providing instructions to browser 130 at the second computer to initiate displaying the URL links that are associated with probability values that are above the specified minimum probability value in the player window 126.

As another option, the process may be programmed to suspend the workflow and store the first input and the second input in association with metadata describing the workflow and for the second computer 120 to transmit the metadata via network 104 to content item storage 122 for storage.

1.1 Example Graphical User Interface

Figure 3:
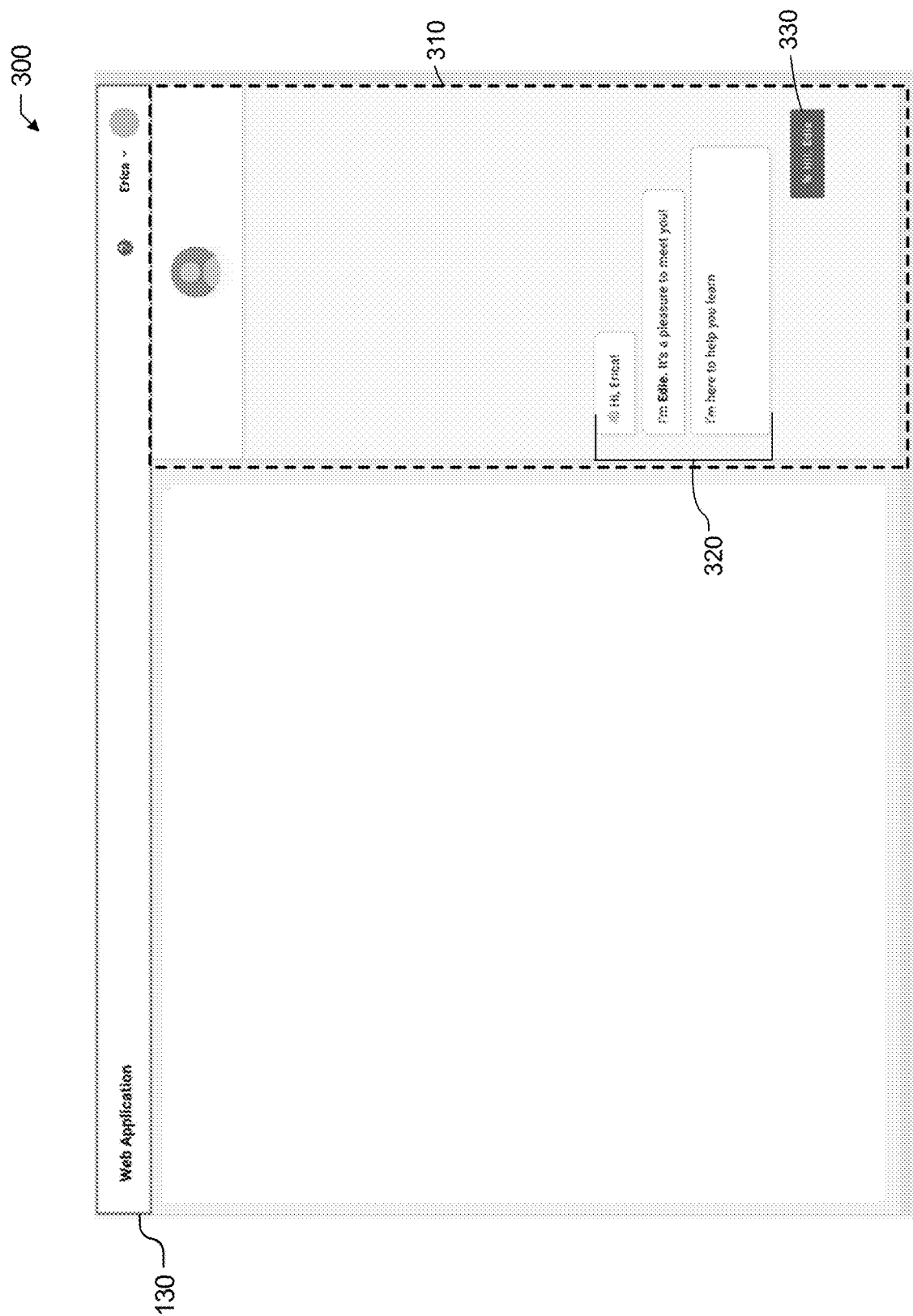
FIG. 3 illustrates an example diagram of a screen display of a graphical user interface in which one embodiment may be implemented via display using a computer display device.

FIG. 3 illustrates an example diagram of a screen display of a graphical user interface in which one embodiment may be implemented.

FIG. 3, and each other drawing figure of this disclosure that shows a graphical user interface or screen displays, is intended to show a portion of a computer display device and to represent outputs, renderings, and/or the execution of presentation instructions that occur under stored program control, via the functional elements that have been described in FIG. 1 and under the control of programmed processes such as FIG. 2. It will be understood that a commercial or practical implementation of FIG. 3, and each other drawing figure of this disclosure that shows a graphical user interface or screen displays, involves creating, testing, and debugging programs, scripts, images, and commands that interoperate to output the content shown in the drawing figures or presentation instructions or browser-side script code that could be interpreted at the browser to render the content shown in the drawing figures, and the preparation of such programs, scripts, images, and commands is within the level of ordinary skill to which this disclosure is directed. A specific disclosure of programs, scripts, images, and commands is not needed as FIG. 3, and each other drawing figure of this disclosure that shows a graphical user interface or screen displays communicate the configuration and content that should result from the programming.

In one embodiment, a computer-assisted coaching cycle may begin with a screen display of a graphical user interface as demonstrated in diagram 300. In an embodiment, first computer 102 may provide instructions to browser 130 at the second computer 120 to render a conversational assistant interface 310 in diagram 300 as part of a GUI. As an example and not by way of limitation, the conversational assistant interface 310 may contain conversational output 320 and an interface for receiving input 330.

In an embodiment, the conversational assistant interface 310 may produce conversational output 320 in the form of a conversation workflow and provide a plurality of selectable options in response to an input prompt. In this example, the conversational output 320 consists of an introduction to the conversational assistant, and the selectable option is demonstrated by input 330 of "Hi, Edie." As an example and not by way of limitation, a plurality of selectable options may be presented for display on the client computing device, where the second computer 120 may detect input by a pointing device or touchscreen of the second computer. As another example and not by way of limitation, input 330 may take the form of text input in an editable text field, wherein the second computer 120 may detect input from a keyboard. Furthermore, as described further herein in other sections, the conversational assistant interface 310 can be programmed to use input 330, in the context of a programmed workflow that includes output 320 as one element, to drive changes to other user interface elements in the GUI of diagram 300.

Figure 4:
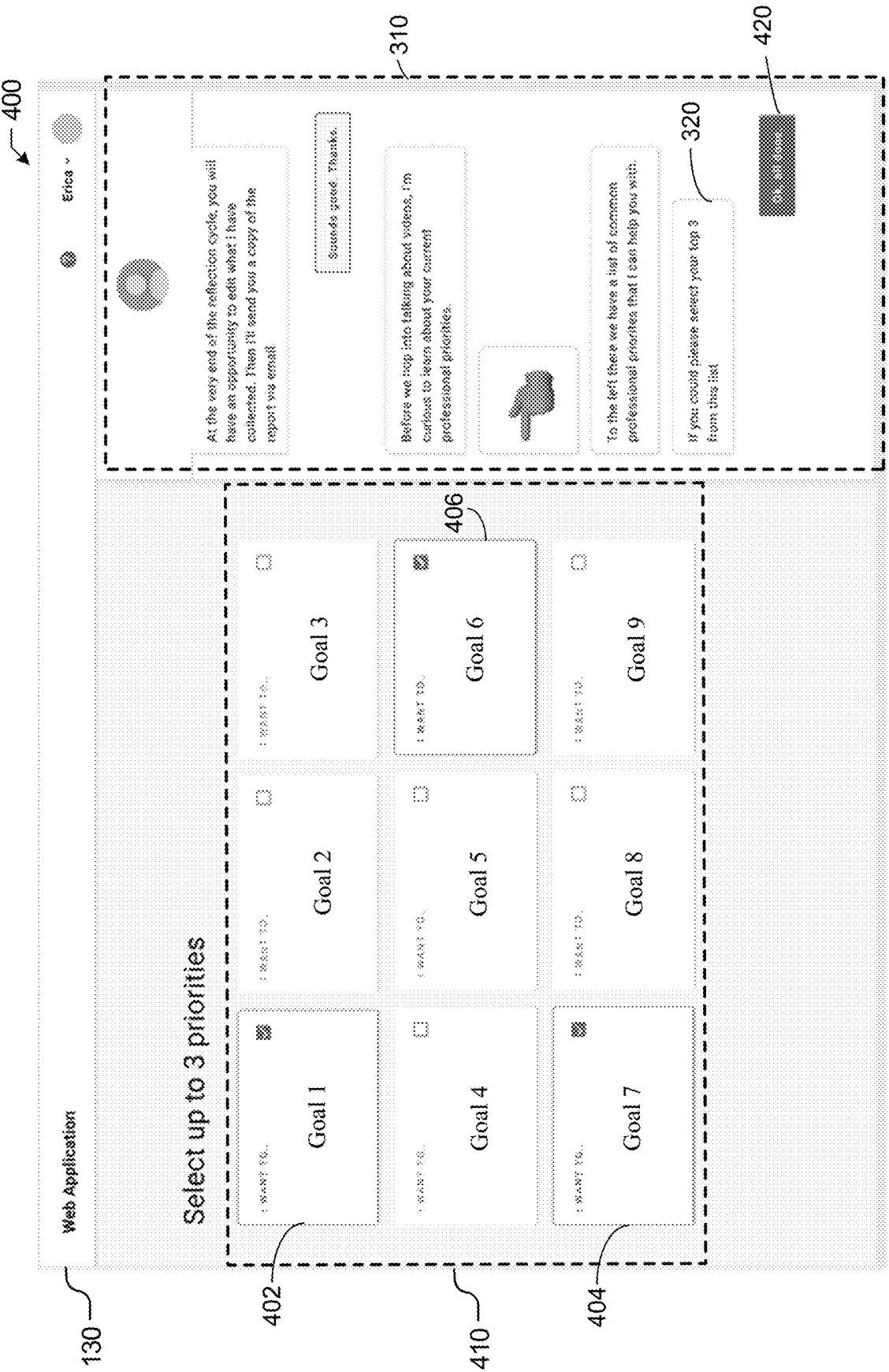
FIG. 4 illustrates an example diagram of a screen display of an interactive graphical user interface in which one embodiment may be implemented.

FIG. 4 illustrates an example diagram 400 of a screen display of an interactive graphical user interface in which one embodiment may be implemented.

In an embodiment, first computer 102 may provide instructions to browser 130 at the second computer 120 to render the conversational assistant interface 310 and an interactive user interface (UI) 410. As an example and not by way of limitation, as demonstrated by FIG. 4, the interactive UI 410 may display a plurality of selectable options. A programmed workflow can result in the specific output 320 of FIG. 4 and concurrently cause generating instructions which when rendered cause displaying the interactive UI 410 near but separated from the conversational assistant interface 310. Thus, the programmed workflow both causes specific output 320 to appear in the conversational assistant interface 310 and drives changes to other parts of a GUI.

In this example, interactive UI 410 within browser 130 may display instructions for a client to "Select up to 3 priorities," in which a client may provide input via a click, tap, touch, or other signal to select one or more of the selectable options. In embodiment, conversational output 320 may instruct the client to select a threshold number of selectable options. In this example, the conversational output 320 states "If you could please select your top 3 from this list," which may prompt the client to follow the instructions. In an embodiment, functionality of a selectable option 420 may be disabled until the client has selected the threshold number of selectable options. In the example of FIG. 4, the client has selected options 402, 404, and 406, as indicated by the checkboxes.

In this example, because the client has achieved the threshold number of selectable options (e.g., selecting up to three priorities), selectable option 420 may be enabled for a client to select "Ok, all done," which may instruct the conversational assistant interface 310 to proceed to the next step of the workflow. Thus, the workflow is programmed to change state in response to detecting input to the selectable option 420 and to cause a change in the form, position, and/or content of the GUI, as shown in FIG. 5.

As demonstrated in FIG. 4, options 402, 404, and 406 are selected. In this example, each option represents a goal or intention that the client has determined to be a priority. As an example and not by way of limitation, options 402, 404, and 406 may include "assess student understanding," "lead student discussion," "build a positive relationship with the students," and/or "set expectations for student behavior." In an embodiment, the priorities (e.g., options 402, 404, and 406), once selected, may be used to personalize other aspects of the client experience, both within the conversational assistant interface 310 and the interactive UI 410. As an example and not by way of limitation, client input of options 402, 404, and 406 may instruct the conversational assistant system 140 to retrieve context from the conversational knowledge graph 142 and determine one or more workflows corresponding to the client input of goals or intentions. For example, when a client selects a goal of "build a positive relationship with the students," the conversational assistant system 140 may tailor the remaining workflow to lead the client through a coaching cycle focused on "building positive relationships with the students."

Figure 5:
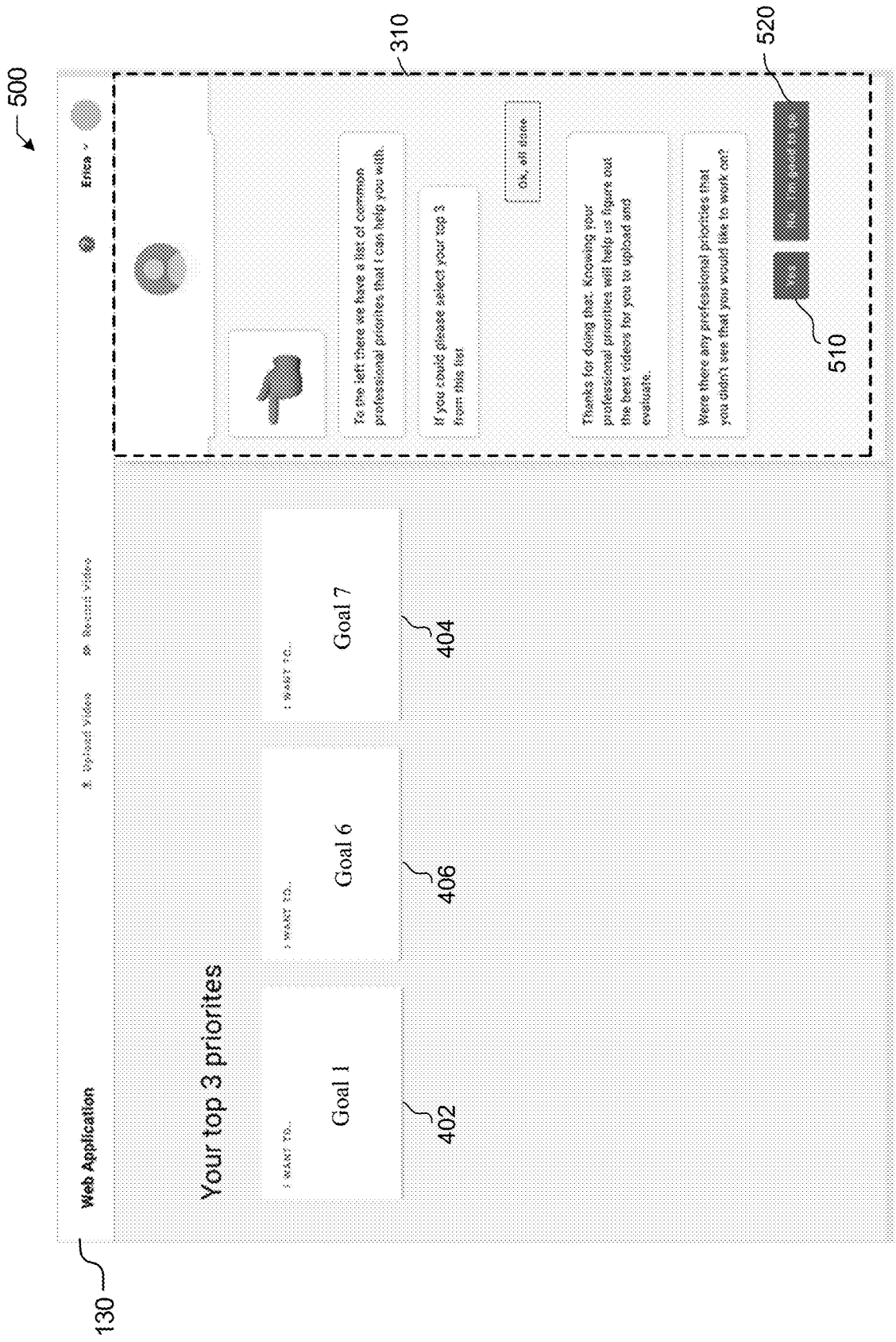
FIG. 5 illustrates an example diagram of a screen display of an interactive graphical user interface in which one embodiment may be implemented.

As an example and not by way of limitation, when a client selects option 402 within interactive UI 410, then in response to selection of the selectable option 420, a rephrased version of option 402 may be presented to the client in a different format and arrangement, as demonstrated in FIG. 5. The workflow can be programmed to cause redisplaying Goal 1, Goal 6, and Goal 7 based on the selection of options 402, 404, 406, without other UI elements, thus reconfiguring the format and content of the GUI to the form of FIG. 5 rather than as shown in FIG. 4. In this example, the selection of options 402, 404, and 406 may be collected as an input dataset to the conversational assistant system 140, wherein the conversational assistant system 140 may pass the input dataset to NLU module 144 and update the conversational knowledge graph 142 with the client input. Thus with each subsequent client input, the conversational assistant system 140 may be further trained. In an embodiment, one or more machine learning algorithms may process input from the NLU module 144 and generate output and a set of instructions for displaying the output in browser 130 of computer 120.

FIG. 5 illustrates an example diagram 500 of a screen display of an interactive graphical user interface in which one embodiment may be implemented. In an embodiment, in response to the client providing input in the form of selecting options 402, 404, and 406, first computer 102 and/or the conversational assistant system 140 may provide instructions to update the conversational assistant interface 310. For example, as demonstrated in FIG. 5, the conversational assistant interface 310 may determine that the client selected three of the one or more selectable options, and as a result, prompts the client with an additional prompt. As an example and not by way of limitation, the next prompt in the coaching cycle workflow may ask the client "Were there any professional priorities that you didn't see that you would like to work on?" In this example, the client may be presented with a plurality of selectable options 510 and 520 as a response to the prompt. As previously discussed in FIG. 4, the client may provide input via a click, tap, touch, or other signal to select either option 510 or 520.

In an embodiment, systems and methods disclosed herein may be utilized without the use of a display. For example, in certain embodiments, the conversational assistant system 140 may provide instructions to communicate with a user via auditory language in addition to or instead of written language. Moreover, the user may provide inputs to the conversational assistant system via auditory language captured by a microphone of a user device. Such embodiments may be utilized regardless of whether the conversational assistant interface 310 is currently displayed on the user's device. In certain embodiments, a user may toggle between written inputs and/or outputs and auditory inputs and/or outputs by selecting one or more options displayed on the user's device. In certain other embodiments, the user may toggle between written inputs and/or outputs and auditory inputs and/or outputs by minimizing or opening a window. In certain other embodiments, the user may toggle between written inputs and/or outputs and auditory inputs and/or outputs through a preset initial auditory command.

Figure 6:
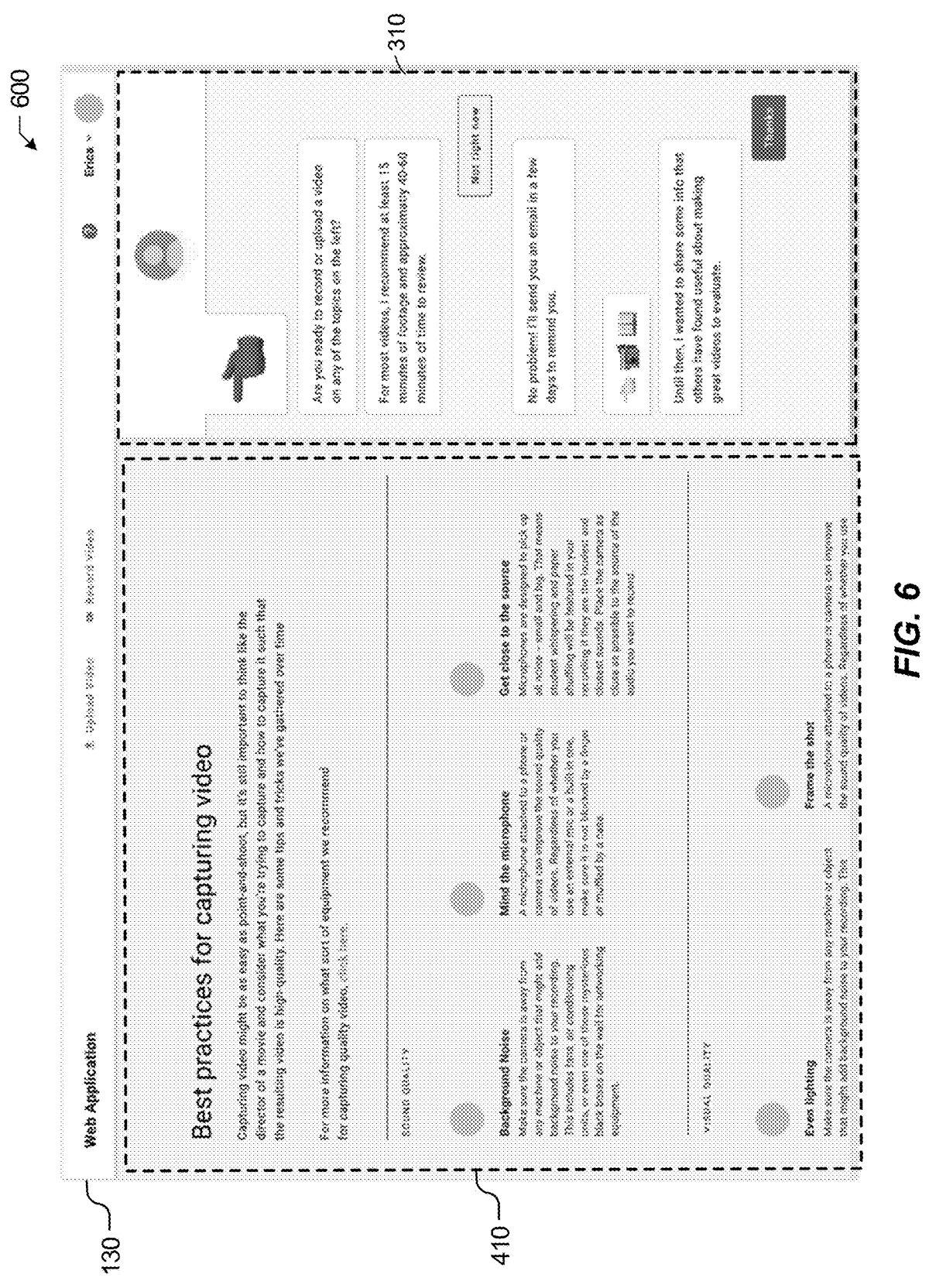

FIG. 6 illustrates an example display 600 of a graphical user interface depicting recording tips. FIG. 6 provides an example of the programmed workflow driving specific content in the conversational assistant interface 310 and also driving the display of a content window in the interactive UI 410 with content that corresponds to a dialog occurring in the conversational assistant interface 310.

In an embodiment, first computer 102 may provide instructions to browser 130 at the second computer 120 to render the conversational assistant interface 310 and interactive UI 410 to prompt the client to upload one or more video recordings to the application. As an example and not by way of limitation, interactive UI 410 may be arranged to cause a graphical user interface to prompt or permit the client to record video in an attached webcam and microphone, store and upload the video, and then associate the new video with the current coaching cycle. As another example and not by way of limitation, interactive UI 410 may contain a widget configured with a file selection button which, when selected, causes initiating a file browse dialog with which the user may select a file, such as a graphic image, on computer 120 or a network resource and upload the file to the system.

Alternatively, client input specifying a URL referring to a network resource may be received via a URL field, and a name field may be configured to receive text input specifying a name for the URL. Selecting a "continue" button may cause transferring the file specified to computer 120 for storage in a record associated with information identifying the video. In an embodiment, the client may delay the workflow until a later time. In response to the client input indicating direction to delay the workflow until a later date, upon which computer 102 may provide instructions to browser 130 at the second computer 120 to render a calendar interface 710, as discussed below in FIG. 7A, FIG. 7B, FIG. 7C.

Figures 7A, 7B, 7C:
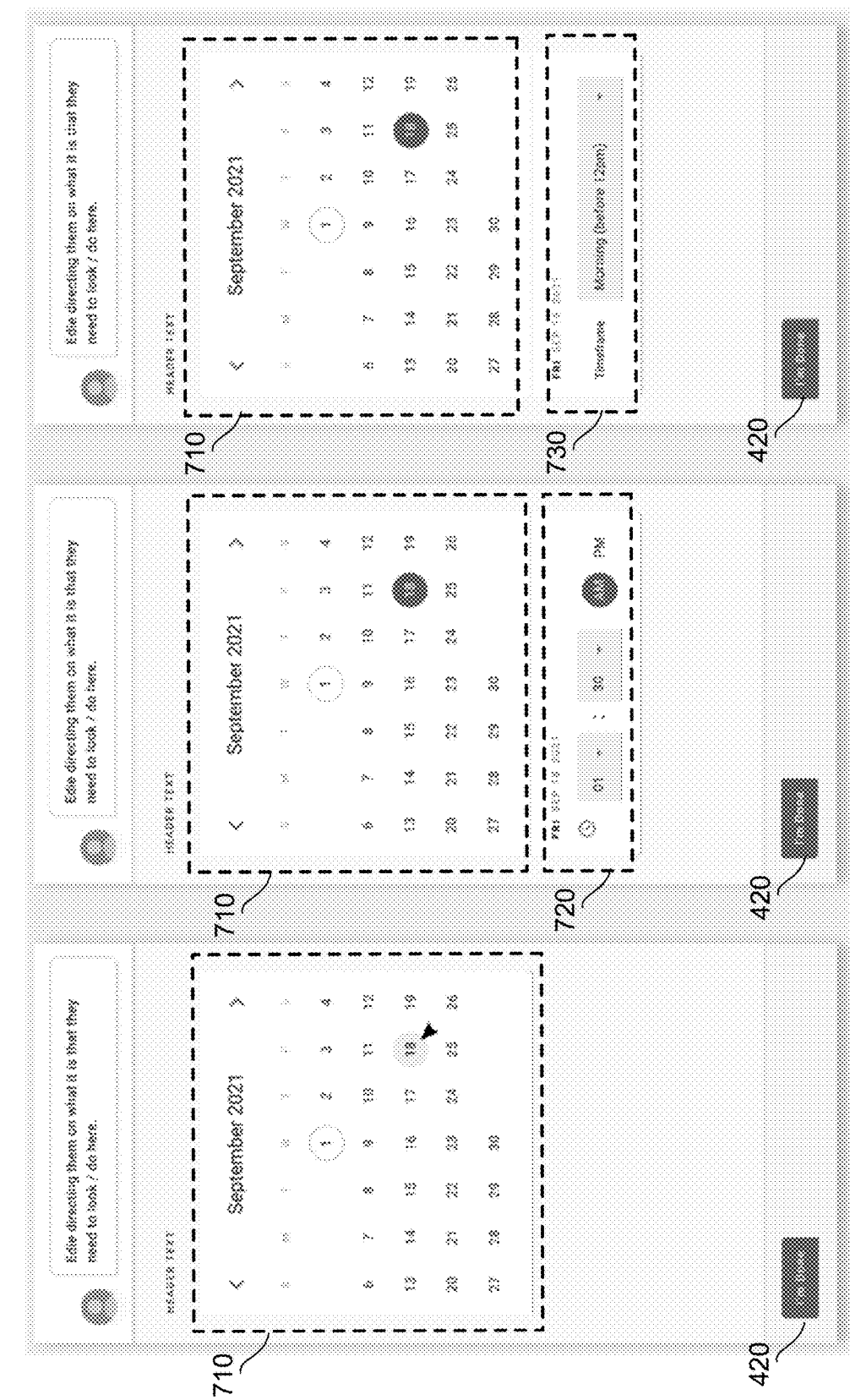
FIG. 7A, FIG. 7B, FIG. 7C illustrate example diagrams of a screen display of a graphical user interface depicting a calendar functionality.

FIG. 7A, FIG. 7B, FIG. 7C illustrate example diagrams 700 of a screen display of a graphical user interface depicting a calendar functionality.

In an embodiment, referring first to FIG. 7A, the client may be presented with calendar interface 710 in browser 130 of computer 120. In an embodiment, the conversational assistant system 140 may determine an input threshold (e.g., one date must be selected) to enable functionality of the selectable option 420, indicating that the user is done scheduling, in which calendar interface 710 may be terminated.

In FIG. 7B, the calendar interface 710 may include an additional component of a time-scheduling interface 720. In this example, conversational assistant system 140 may determine an input threshold of two client inputs before terminating the interface; the first being a date selection within calendar interface 170, and the second being a time selection within time-scheduling interface 720.

As another example and not by way of limitation, in FIG. 7C, the conversational assistant system may determine an input threshold of two client inputs; the first input being the selection of a date in calendar interface 710, and the second being the input of a timeframe in timeframe interface 730. Upon determining the number of client input has satisfied the specified threshold, the interface may enable functionality of the selectable option 420, and allow the client system with the selectable option to indicate the calendaring task is finished. In this example, functionality of the selectable option 420 may indicate "I'm Done," in which the conversational assistant system 140 may transmit instructions to browser 130 of computer 120 to terminate the calendar interface 170 and return to the coaching cycle.

Figure 8:
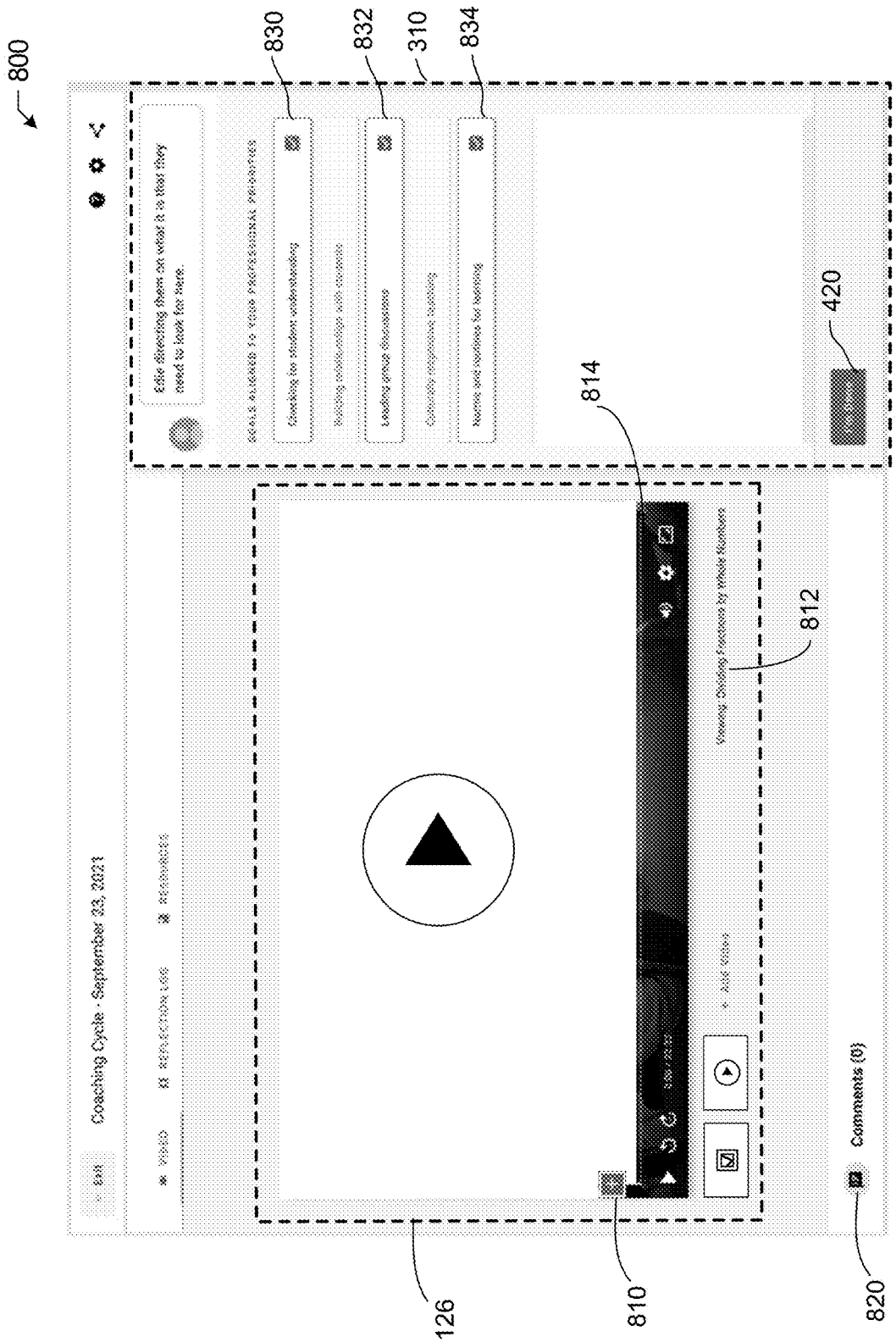
FIG. 8 illustrates an example diagram of a screen display of a graphical user interface depicting a coaching cycle in which one embodiment may be implemented.

FIG. 8 illustrates an example diagram 800 of a screen display of a graphical user interface depicting a coaching cycle workflow in which one embodiment may be implemented. In an embodiment, the conversational assistant interface 310 may be located next to player window 126. While FIG. 8 depicts an interface for displaying video content, the systems and methods described herein may be performed with respect to different content items 124, such as audio or image items. Additionally, the systems and methods described herein may be applied to a set of content items 124, such as an interface displaying a plurality of video content items. As an example and not by way of limitation, player window 126 may comprise video title 812. Video title 812 may be stored as content item metadata for a particular video and supplied to the player window 126 when the particular video is selected.

In an embodiment, playback timeline 814 may comprise one or more playback controls and a timeline corresponding to a timeline of the video being displayed on the player window 126. The player window 126 may additionally include an option for generating content 810. As an example and not by way of limitation, content 810 may include a task, comment 820, timeline comment, and/or non-timestamped comment. In this example, the interactive UI 410 may include one or more general elements such as one or more menu options, and specific elements such as unique elements for a particular page or displayed content items 124. An option for generating a task may be included in the general elements of the platform interface. When the option is selected, the computer providing the interactive UI 410 may determine whether a content item 124 is being displayed through the interface. If a content item 124 is being displayed through the interface and/or is selected on the interface, the computer may utilize metadata from the content item in creating the task.

In an embodiment, comments 820 may comprise one or more comments related to the video displayed on the player window 126. Each comment may be related to a comment record, the comment record including comment input data, such as comment text, images, audio, or video data, commenter identification data, such as a username, a selected category of a taxonomy, a comment type, and/or a timestamp of the comment. In an embodiment, an option for generating a new comment may be displayed on the interface, such as above existing comments or on an existing comment, forming a thread. In an embodiment, when a request to create a new comment is received, the interface may display one or more comment creation options. The comment creation options may include options to identify a comment type for a comment, options to select a taxonomy or category type of the taxonomy for the comment, options for specifying a location within a content item 124 to which the comment relates, such as a physical location in an image or a temporal location in an audio or visual content item 124, and/or options for generating and/or uploading comment input data.

As previously discussed, the comment creation options may further comprise an option to generate a task from the comment. For example, the creation options may include an editable textbox for inserting comment text, a drop-down menu for specifying a category type of the taxonomy, and a selectable option for proposing the comment as an intention. The intention may inform the conversational assistant system 140 of a coaching cycle workflow to execute. Further, if the selectable option for proposing the comment as an intention is selected, computer 102 may additionally create a task record using data from the comment record and/or data used to create the comment record. In an embodiment, the option to propose the comment 820 as an intention may be selectable from a comment that has already been created. In response to receiving a selection of a comment 820, the computer may cause display of an option to propose the comment 820 as an intention, thus launching the corresponding workflow in browser 130. In an embodiment, at FIG. 8, computer 102 and/or 120 may transmit instructions to the conversational assistant system 140, indicating a threshold number of comments 820, strengths, notes, or other tasks required to progress to the next stage of the coaching cycle workflow, as demonstrated in diagram 900 of FIG. 9. For example, the conversational assistant interface 310 may prompt the client to input a minimum of three strengths 910 and three notes 920 to complete the stage of the workflow as demonstrated in diagram 900. As an example and not by way of limitation, if the client does not input the threshold number of strengths 910 and/or notes 920, the conversational assistant interface 310 may obstruct the client from selecting functionality of the selectable option 420. In this example, functionality of the selectable option 420 indicates "I'm Done," which upon selection, may indicate that the segment of the workflow is complete and send instructions to conversational assistant system 140 to progress with the coaching cycle workflow.

In an embodiment, comments 820 and tasks may be generated based on a selection of a timestamp in the playback timeline 814. As an example and not by way of limitation, timeline comments may comprise a comment generation interface displayed in response to a selection of a timestamp on the playback timeline 814. Computer 120 may convert the selected location on the playback timeline 814 to a time within the video and store data identifying the time within the video with the comment record created from the timeline comment. The interface of a timeline comment may comprise options for identifying a comment type, inserting comment input data, selecting a category type of the taxonomy, and proposing the comment as an intention. Computer 120 and/or 102 may generate a comment record comprising the timestamp, the comment category, the comment input data, and/or the category type of the taxonomy.

In an embodiment, if the option to propose the comment 820 as an intention, the computer 120 may additionally generate a task record For example, the computer 120 may detect a location of a cursor on the player window 126. When the location of the cursor overlaps with a vertical bar on the timeline that is associated with a comment 820, the computer 120 may cause display of the comment 820 in a similar manner as timeline comment along with an option to propose the comment as an intention. In response to a selection of the option to propose the comment 820 as an intention, the computer may generate a task record using data from the comment record associated with the comment.

In some embodiments, non-timestamped comments may comprise an interface for generating overall comments on the displayed content item. Unlike the other comments, the non-timestamped comment is not related to a particular timestamp. While the interface for non-timestamped comment only includes an editable textbox and option to propose the comment as commitment, in other embodiments the interface for non-timestamped comment additionally includes options to select a category type of the taxonomy and/or a comment type. In response to input in the interface for non-timestamped comment, the computer may generate a non-timestamped comment record. If the option to propose as an intention is selected, the computer may additionally generate a task from the input data.

In particular embodiments, conversational assistant interface 310 may display modal panels that are otherwise unable to be triggered by the client through any UI element. In this example, the conversational assistant interface 310 may prompt the user to select one or more selectable options from a modal panel (e.g., "GOALS ALIGNED TO YOUR PROFESSIONAL PRIORITIES"). For example, as demonstrated in FIG. 8, the conversational assistant interface 310 may prompt the client to select one or more goals 830, 832, and 834 from a modal panel within the conversational assistant interface. For example, the conversational assistant interface may display a plurality of selectable options, such as "check for student understanding," or "leading group discussions." In particular embodiments, based on client input of one or more goals 830, 832, 834, the conversational assistant system 140 may identify a coaching cycle tailored to the client input goals. As an example and not by way of limitation, based on the client input selecting the one or more selectable options, the conversational assistant system 140 may determine if the input includes a taxonomy and/or category type of the taxonomy. Based on the category type of the taxonomy, computer 102 may instruct the conversational assistant system 140 to retrieve data from the conversational knowledge graph 142 to generate natural language output, furthering the workflow of the coaching cycle as displayed in browser 130 of computer 120. As an example and not by way of limitation, the conversational assistant system may define a threshold of client input before displaying functionality of the selectable option 420. In this example, the client has selected three "Goals aligned to your professional priorities," therefore enabling functionality of the selectable option 420 for the client to indicate that the segment of the workflow is complete.

Figure 9:
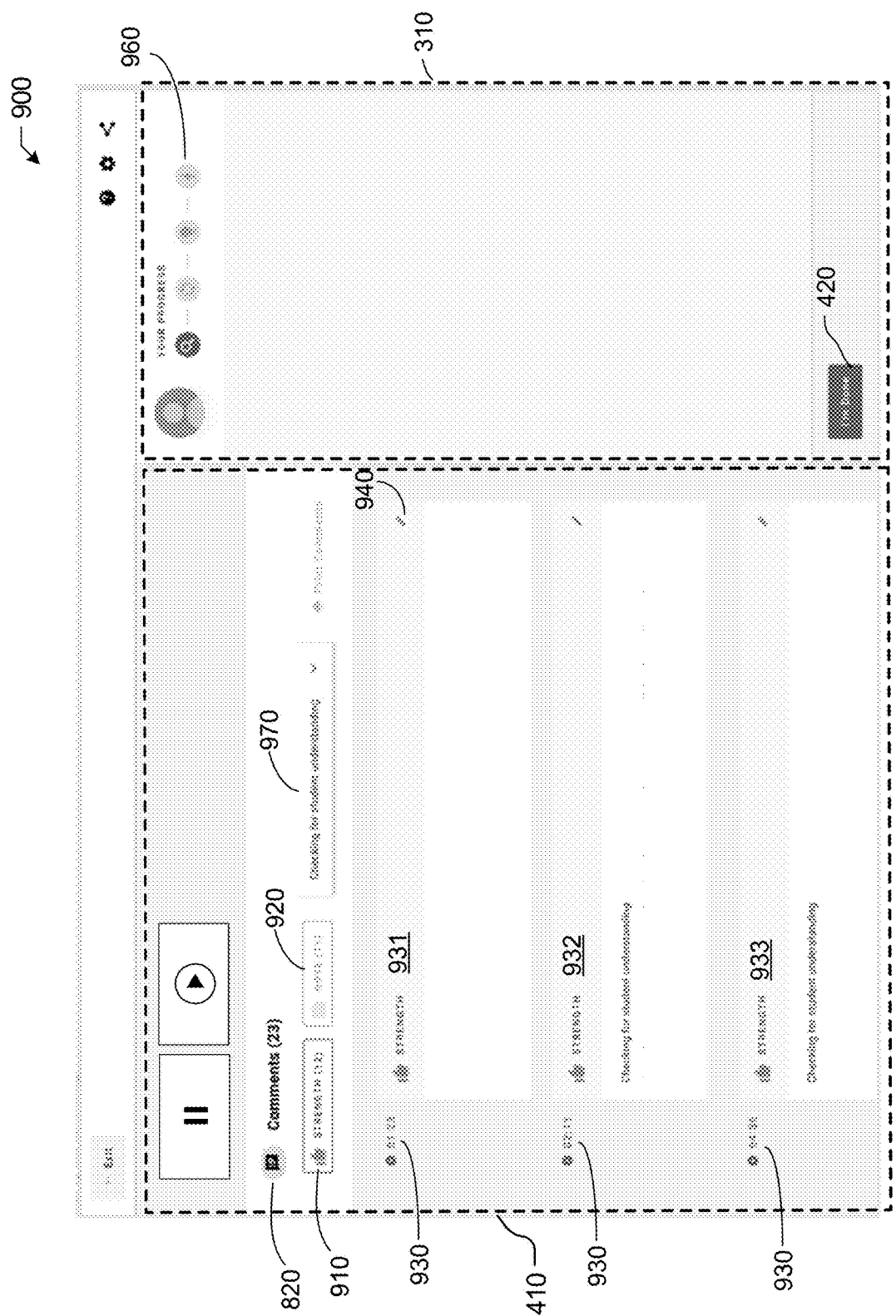
FIG. 9 illustrates an example diagram of a screen display of a graphical user interface of conducting a review.

FIG. 9 illustrates an example diagram 900 of a screen display of a graphical user interface of conducting a review. In an embodiment, the coaching cycle may prompt the client to conduct a review. In an embodiment, the coaching cycle may be comprised of four phases. As an example and not by way of limitation, the phases of the coaching cycle may include Analyze, Reflect, Enact, and Impact. As demonstrated in FIG. 9, the conversational assistant interface 310 may display an indication of which phase of the coaching cycle the client is currently engaged in. For example, progress bar 960 indicates that the client is at the first phase of the coaching cycle (e.g., Analyze).

In particular embodiments, the conversational assistant system 140 may instruct interactive UI 410 to automatically scroll down, revealing one or more content items 124 related to the particular coaching cycle workflow. For example, as demonstrated by FIG. 8, the conversational assistant system 140 may display player window 126, and then instruct interactive UI to automatically scroll down to reveal comments 820, as displayed in FIG. 9. In this example, the conversational assistant system 140 may modify interactive UI 410 without client interaction.

As an example and not by way of limitation, the conversational assistant system 140 may modify the interactive UI 410 and prompt the client to review the plurality of comments 820 input earlier in the coaching cycle workflow. In an embodiment, the comment types may include: Questions, Suggestions, Strengths, and/or Notes. As an example and not by way of limitation, comments 820 may be filtered by strength 910, wherein each strength 910 corresponds to the associated time value 930, indicating a location on the playback timeline 814. As another example and not by way of limitation, the conversational assistant system 140 may automatically filter comments 820 by strength 910, producing filtered comments 931, 932, and 933 for review in interactive UI 410. As demonstrated in FIG. 9, the conversational assistant system 140 may filter comments 820 by strength 910, retrieve data from the conversational knowledge graph 142 corresponding to the taxonomy of strength 910, and display filtered comments 931, 932, and 933 to the client for review along with a prompt in the conversational assistant interface 310 to "review a subset of your comments and summarize them."

Tag 970 may be automatically selected by the conversational assistant system 140 and/or manually selected by the client to filter comments 820. As demonstrated in FIG. 9, comments 820 may be filtered by both strength 910 and tag 970. In this example, comments 820 may be tagged with one or more of a plurality of goals, intentions, or observations, and wherein filtering comments 820 by tag 970 may display comments 820 with the corresponding tag. As an example, tag 970 may be identified as "check for understanding," in which case filtered comments 931, 932, and 933 must have been tagged as "check for understanding" previously in the coaching cycle workflow. In an embodiment, the graphical representation of each strength 910 may comprise a graphical representation of an editable text box 940. For example, the client may input text into editable text box 940 for a description of the strength. Alternatively, the client may enable voice dictation, wherein a text-to-speech (TTS) system may convert the input speech into text corresponding to the strength 910 and associated time value 930.

Alternatively, the graphical user interface may display one or more notes 920 and corresponding timestamps. In an embodiment, at FIG. 8, computer 102 and/or 120 may transmit instructions to the conversational assistant system 140, indicating a threshold number of comments 820, strengths 910, and/or notes 920 that must be reviewed to progress to the next stage of the coaching cycle workflow. For example, the conversational assistant interface 310 may prompt the client to review a minimum of three filtered comments 931, 932, and 933 to complete the stage of the workflow as demonstrated in diagram 900. As an example and not by way of limitation, if the client does not satisfy the requirement to review the threshold number of filtered comments, the conversational assistant interface 310 may obstruct the client from selecting functionality of the selectable option 420. In this example, functionality of the selectable option 420 indicates "I'm Done," which upon selection, may indicate that the segment of the workflow is complete and send instructions to conversational assistant system 140 to progress with the coaching cycle workflow.

Figure 10:
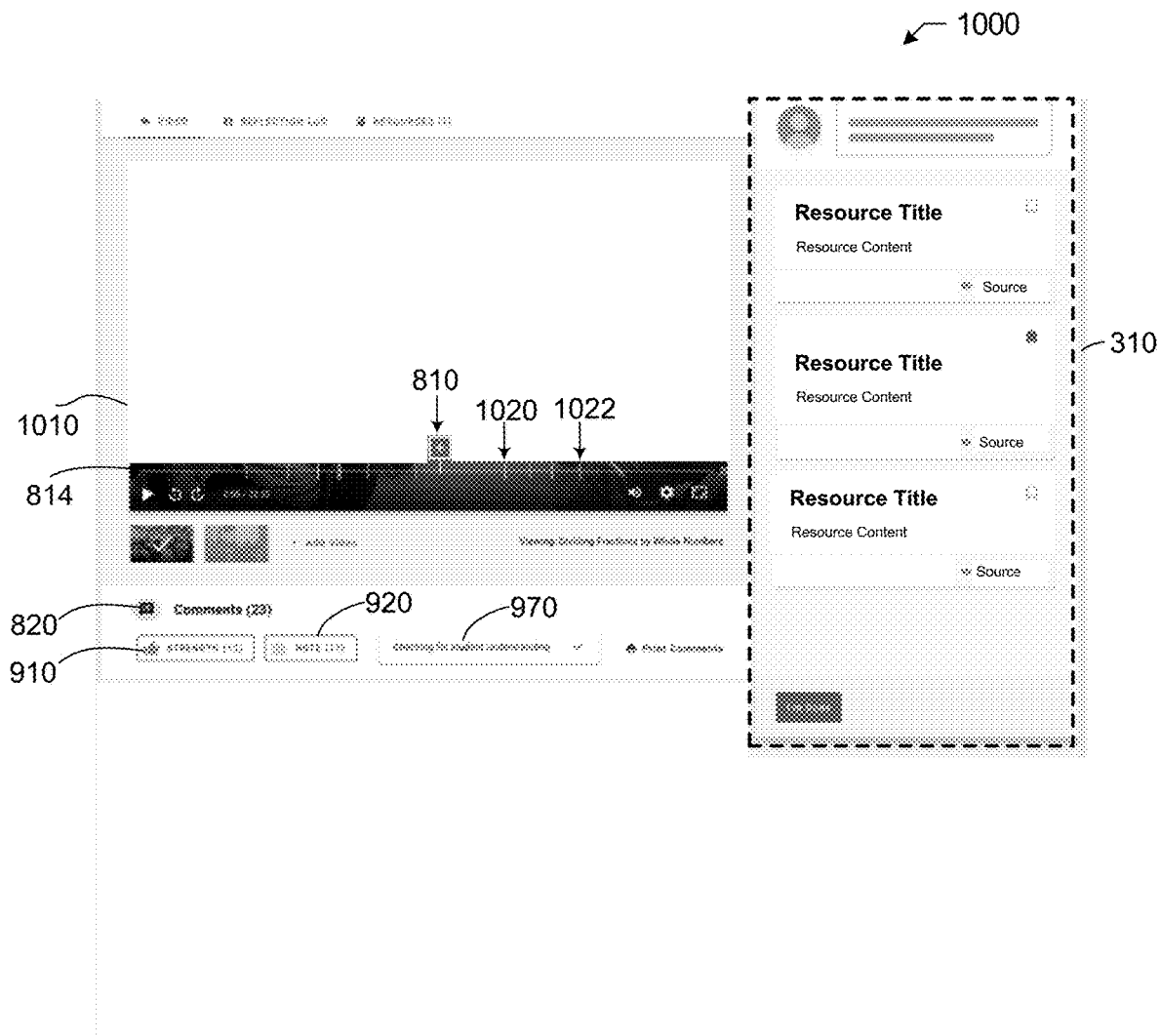
FIG. 10 illustrates an example diagram of a screen display of a graphical user interface of analyzing video and previewing resources.

FIG. 10 illustrates an example diagram 1000 of a screen display of a graphical user interface of analyzing video and previewing resources. In an embodiment, the conversational assistant interface 310 may prompt the client to analyze one or more videos previously uploaded as part of the coaching cycle. Similarly to FIG. 9, the conversational assistant interface 310 may prompt the client to review the plurality of comments 820 input earlier in the coaching cycle workflow. In an embodiment, the comment types may include: Questions, Suggestions, Strengths, and/or Notes. In this example, comments 820 are filtered by strength 910, wherein each strength 910 corresponds to the associated time value 930, indicating a location on the playback timeline 814. In an embodiment, the graphical representation of each strength 910 may comprise a graphical representation of an editable text box 940. For example, the client may input text into editable text box 940 for a description of the strength. Alternatively, the graphical user interface may display one or more notes 920 and corresponding timestamps.

In an embodiment, playback timeline 814 may comprise one or more playback controls and a timeline corresponding to a timeline of the video being displayed on the player window 126. The player window 126 may additionally include an option for generating content 810. As an example and not by way of limitation, content 810 may include a task, comment 820, timeline comment, and/or non-timestamped commend. In this example, a platform may include one or more general elements such as one or more menu options, and specific elements such as unique elements for a particular page or displayed content items. In an embodiment, vertical lines of different shades on the playback timeline 814 correspond to different types of content 810. In this example, line 1020 corresponds to a Note comment type, while line 1022 corresponds to a Strength comment type.

In an embodiment, the conversational assistant system 140, using a trained machine learning classifier, may identify one or more sets of ("URL") links to online resources associated with probability values that are above a specified minimum probability value corresponding to the one or more goals identified by the client in the coaching cycle. Conversational assistant system 140 may generate instructions to display the one or more sets of ("URL") links to online resources in the conversational assistant interface 310, which when selected, causes computer 120 to open and display the contents of the webpage.

Figure 11:
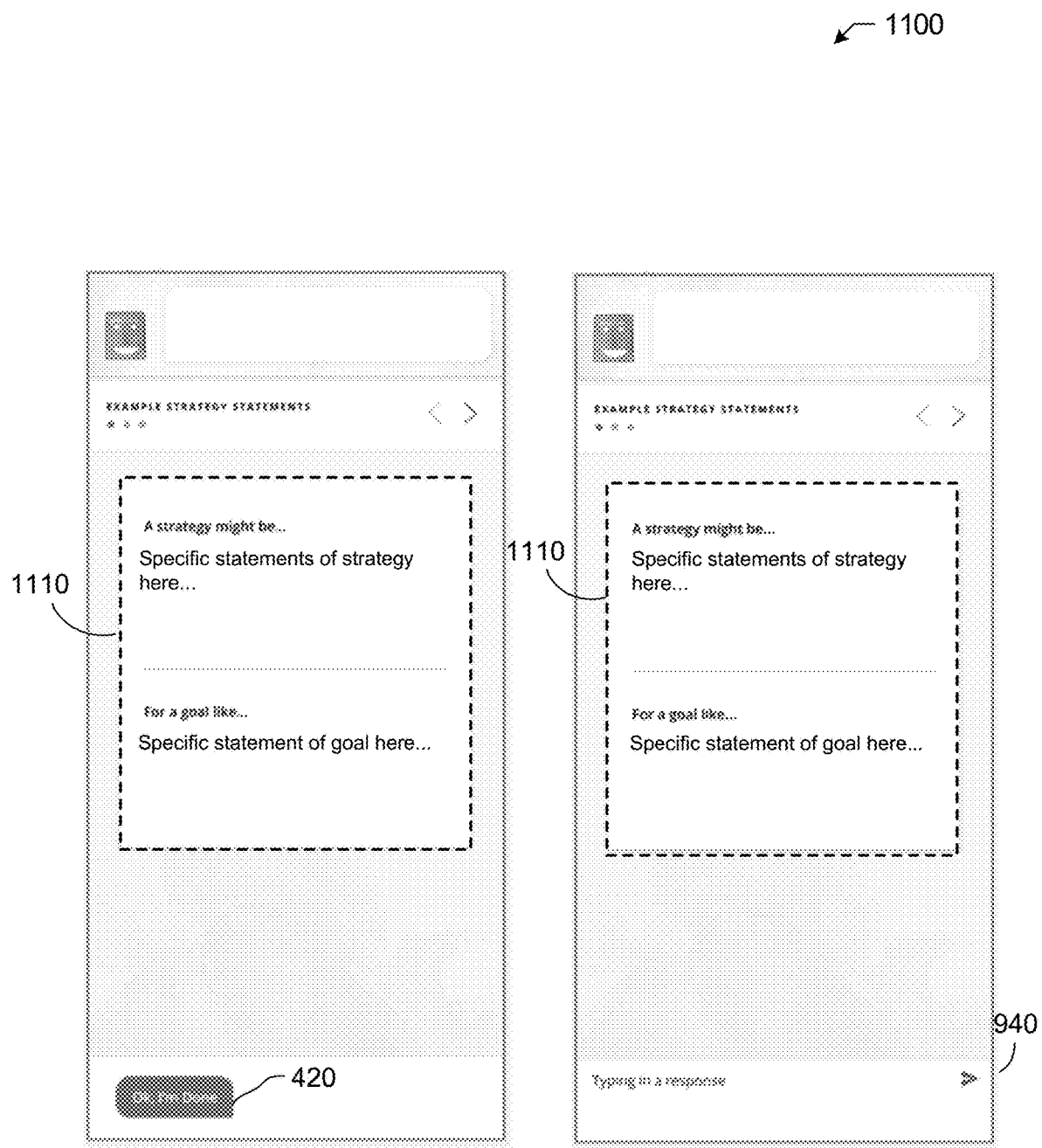
FIG. 11 illustrates an example diagram of a screen display of a graphical user interface of providing strategy recommendations.

FIG. 11 illustrates an example diagram 1100 of a screen display of a graphical user interface of providing strategy recommendations. As previously discussed in FIG. 8, the conversational assistant interface 310 may prompt the client to select one or more goals 830, 832, 834. Based on the client input selecting the one or more selectable options, the conversational assistant system 140 may determine if the input includes a taxonomy and/or category type of the taxonomy. Based on the category type of the taxonomy, computer 102 may instruct the conversational assistant system 140 to retrieve data from the conversational knowledge graph 142 to generate natural language output, furthering the workflow of the coaching cycle as displayed in browser 130 of computer 120. In this example, the coaching cycle proceeds to provide one or more strategy recommendations 1110. As demonstrated in FIG. 11, in response to client input of one or more goals, the conversational assistant system 140 may determine strategy recommendation 1110. For example, in response to a goal of "Quickly assess students' understanding and mastery of the lesson topic," the strategy recommendation 1110 may be "Implement 'four-finger rating' and 'show your thumbs' styles of checking student understanding during guided practice." In an embodiment, the client may terminate the strategy recommendation 1110 workflow of the coaching cycle by selecting functionality of the selectable option 420. As another example and not by way of limitation, the graphical representation of the strategy recommendation 1110 may comprise a graphical representation of an editable text box 940. For example, the client may input text into editable text box 940 in response to the strategy recommendation 1110.

Figure 12A:
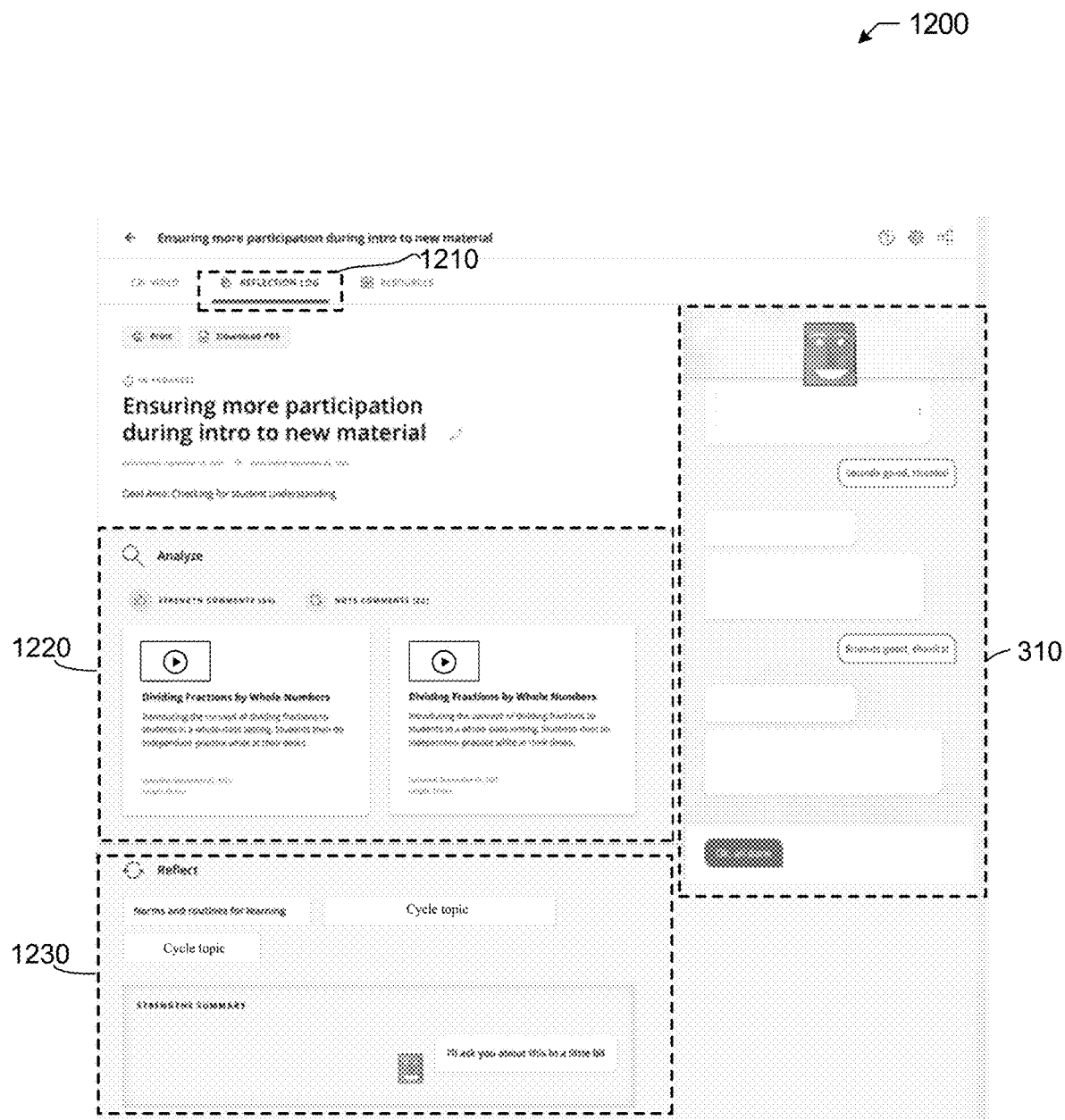
FIG. 12A, FIG. 12B illustrate example diagrams of a screen display of a graphical user interface of a reflection log.

FIG. 12A illustrates an example diagram 1200 of a screen display of a graphical user interface of a reflection log 1210. In an embodiment, reflection log 1210 may be one selectable option available to the client after completing the task of analyzing video, as demonstrated in FIG. 8, FIG. 9, FIG. 10. In particular embodiments, conversational assistant system 140 may generate conversational output 320 within the conversational assistant interface 310, instructing the client to begin a review in reflection log 1210. In this example, conversational assistant system 140 may automatically select the tab of reflection log 1210, thereby modifying interactive UI 410 to display the reflection log 1210 interface and continue the coaching cycle workflow in the reflection log 1210. As an example and not by way of limitation, browser 130 of computer 120 may display a graphical representation of an analyze section 1220 and reflect section 1230. In this example, analyze section 1220 may display the title of one or more videos uploaded to the coaching cycle, and a final count of strength comments and/or note comments. Reflect section 1230 may comprise one or more selectable options and an editable text box 940 configured to indicate a summary of strengths as previously entered in FIG. 10. As another example and not by way of limitation, reflect section 1220 may comprise one or more selectable options and an editable text box configured to indicate a summary of the previously entered notes.

Figure 12B:
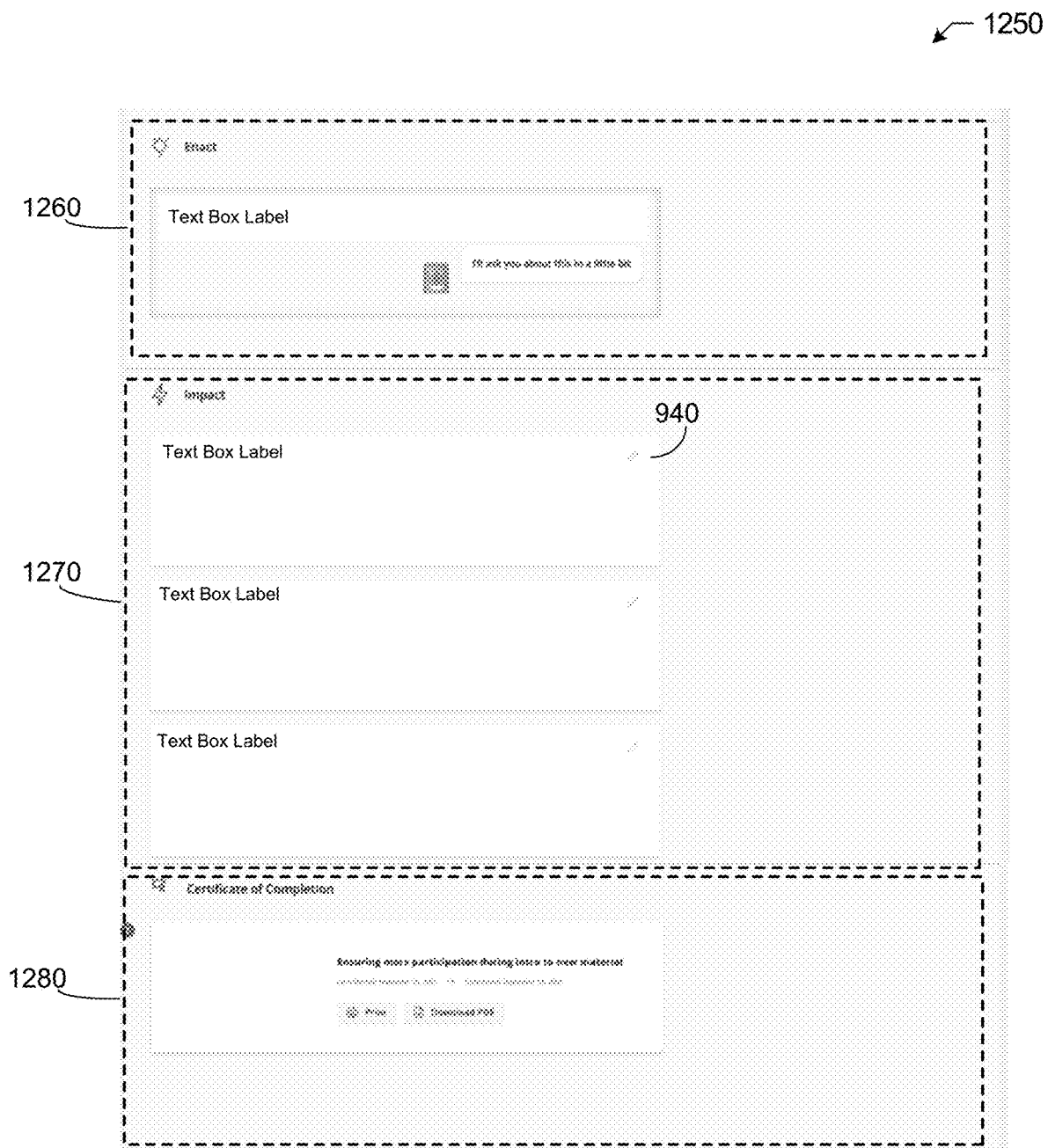

FIG. 12B illustrates an example diagram 1250 of a screen display of a graphical user interface of a reflection log 1210. In an embodiment, browser 130 of computer 120 may display a graphical representation of an enact section 1260, impact section 1270, and issue a certificate of completion 1280 upon completion of the coaching cycle workflow. In an embodiment, enact section 1260 and impact section 1270 may comprise a graphical representation of an editable text box 940 for inputting text responses. Alternatively, enact section 1260 and impact section 1270 may enable voice dictation, wherein a text-to-speech (TTS) system may convert the input speech into text in the editable text box 940.

It will be apparent from the examples of FIG. 3 to FIG. 12B inclusive that a chatbot or other conversational assistant can be programmed to control, according to a programmed workflow, tasks, or other instructions, the presentation of specific GUI elements other than chatbot or conversational content, such as windows, video players, informational displays, interactive commenting facilities, or any other GUI widget or element that is useful in an automated workflow. Moreover, it can cause the display of information in an ergonomically improved manner. The GUI elements, which the workflow controls presenting, can be presented near to the conversational assistant. Furthermore, the programmed workflow can cause replacing a first window, which displays the chatbot or conversational assistant, with other information displays, windows, or widgets, then restoring the chatbot or conversational assistant to continue a conversation with the second computer. The GUI elements can have any size and can have any content within them including static content, widgets, or selectable elements. Additionally, a chatbot or other conversational assistant may be programmed to perform discrete tasks to modify data and the presentation of specific GUI elements according to a programmed workflow, tasks, or other instructions.

2. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 13:
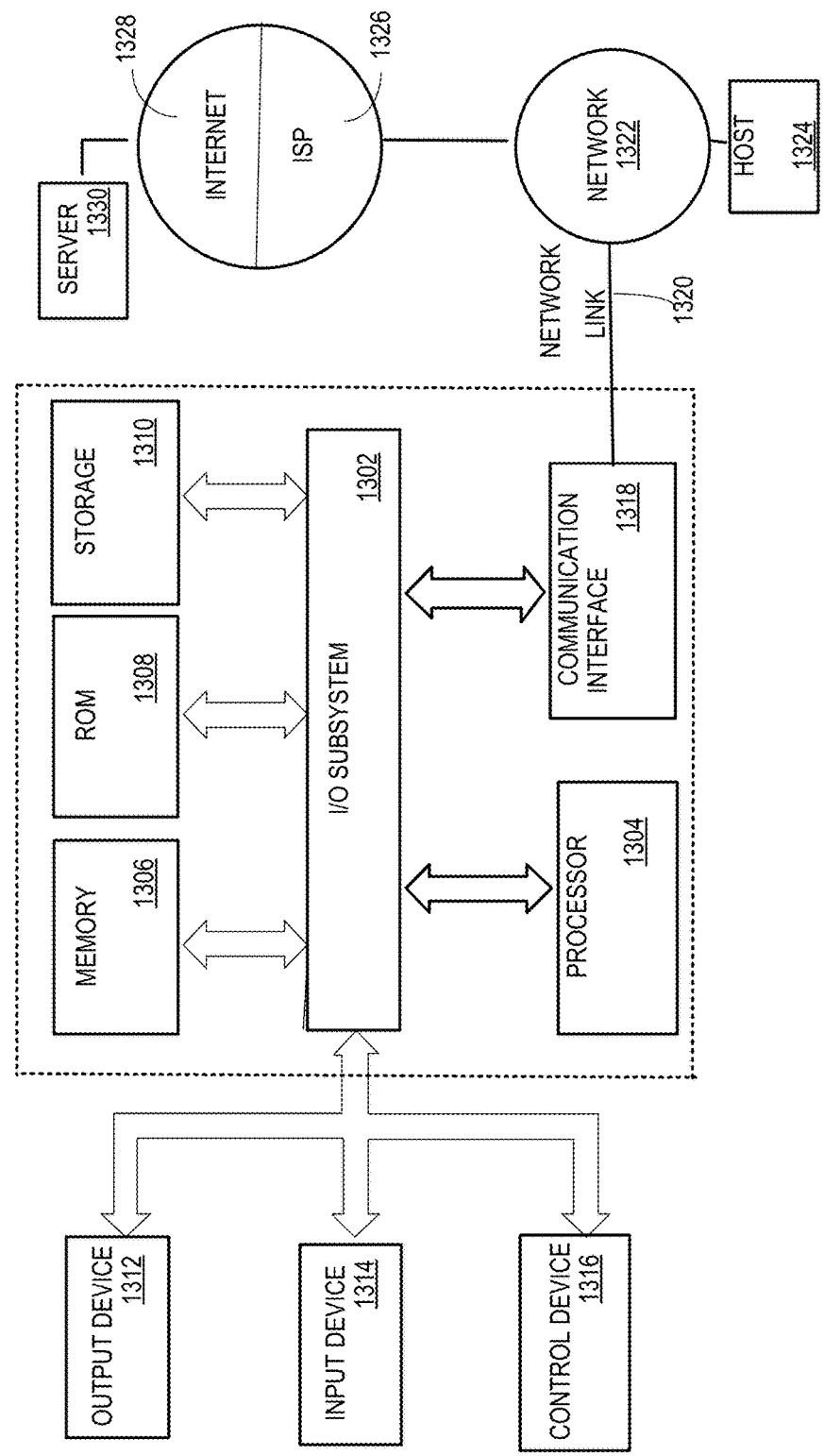
FIG. 13 illustrates a computer system with which one embodiment could be implemented.

FIG. 13 is a block diagram that illustrates an example computer system with which an embodiment may be implemented. In the example of FIG. 13, a computer system 1300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1300 includes an input/output (I/O) subsystem 1302 which may include a bus and/or other communication mechanism(s) for communicating information and/or instructions between the components of the computer system 1300 over electronic signal paths. The I/O subsystem 1302 may include an I/O controller, a memory controller and at least one I/O port. The electronic signal paths are represented schematically in the drawings, for example as lines, unidirectional arrows, or bidirectional arrows.

At least one hardware processor 1304 is coupled to I/O subsystem 1302 for processing information and instructions. Hardware processor 1304 may include, for example, a general-purpose microprocessor or microcontroller and/or a special-purpose microprocessor such as an embedded system or a graphics processing unit (GPU) or a digital signal processor or ARM processor. Processor 1304 may comprise an integrated arithmetic logic unit (ALU) or may be coupled to a separate ALU.

Computer system 1300 includes one or more units of memory 1306, such as a main memory, which is coupled to I/O subsystem 1302 for electronically digitally storing data and instructions to be executed by processor 1304. Memory 1306 may include volatile memory such as various forms of random-access memory (RAM) or other dynamic storage device. Memory 1306 also may be used for storing temporary variables or other intermediate information during execution of instructions to be executed by processor 1304. Such instructions, when stored in non-transitory computer-readable storage media accessible to processor 1304, can render computer system 1300 into a special-purpose machine that is customized to perform the operations specified in the instructions.

Computer system 1300 further includes non-volatile memory such as read only memory (ROM) 1308 or other static storage device coupled to I/O subsystem 1302 for storing information and instructions for processor 1304. The ROM 1308 may include various forms of programmable ROM (PROM) such as erasable PROM (EPROM) or electrically erasable PROM (EEPROM). A unit of persistent storage 1310 may include various forms of non-volatile RAM (NVRAM), such as FLASH memory, or solid-state storage, magnetic disk or optical disk such as CD-ROM or DVD-ROM and may be coupled to I/O subsystem 1302 for storing information and instructions. Storage 1310 is an example of a non-transitory computer-readable medium that may be used to store instructions and data which when executed by the processor 1304 cause performing computer-implemented methods to execute the techniques herein.

The instructions in memory 1306, ROM 1308 or storage 1310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; client interface instructions to render or interpret commands for a graphical user interface (GUI), command-line interface or text client interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1300 may be coupled via I/O subsystem 1302 to at least one output device 1312. In one embodiment, output device 1312 is a digital computer display. Examples of a display that may be used in various embodiments include a touch screen display or a light-emitting diode (LED) display or a liquid crystal display (LCD) or an e-paper display. Computer system 1300 may include other type(s) of output devices 1312, alternatively or in addition to a display device. Examples of other output devices 1312 include printers, ticket printers, plotters, projectors, sound cards or video cards, speakers, buzzers or piezoelectric devices or other audible devices, lamps or LED or LCD indicators, haptic devices, actuators or servos.

At least one input device 1314 is coupled to I/O subsystem 1302 for communicating signals, data, command selections or gestures to processor 1304. Examples of input devices 1314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1316, which may perform cursor control or other automated control functions such as navigation in a graphical interface on a display screen, alternatively or in addition to input functions. Control device 1316 may be a touchpad, a mouse, a trackball, or cursor direction keys for communicating direction information and command selections to processor 1304 and for controlling cursor movement on an output device 1312 such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1314 may include a combination of multiple different input devices, such as a video camera and a depth sensor.

In another embodiment, computer system 1300 may comprise an internet of things (IoT) device in which one or more of the output device 1312, input device 1314, and control device 1316 are omitted. Or, in such an embodiment, the input device 1314 may comprise one or more cameras, motion detectors, thermometers, microphones, seismic detectors, other sensors or detectors, measurement devices or encoders and the output device 1312 may comprise a special-purpose display such as a single-line LED or LCD display, one or more indicators, a display panel, a meter, a valve, a solenoid, an actuator or a servo.

When computer system 1300 is a mobile computing device, input device 1314 may comprise a global positioning system (GPS) receiver coupled to a GPS module that is capable of triangulating to a plurality of GPS satellites, determining and generating geo-location or position data such as latitude-longitude values for a geophysical location of the computer system 1300. Output device 1312 may include hardware, software, firmware and interfaces for generating position reporting packets, notifications, pulse or heartbeat signals, or other recurring data transmissions that specify a position of the computer system 1300, alone or in combination with other application-specific data, directed toward host 1324 or server 1330.

Computer system 1300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1300 in response to processor 1304 executing at least one sequence of at least one instruction contained in main memory 1306. Such instructions may be read into main memory 1306 from another storage medium, such as storage 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1310. Volatile media includes dynamic memory, such as memory 1306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1302. Transmission media can also take the form of acoustic or light waves, such as those generated during radio-wave and infra-red data communications.

Various forms of media may be involved in carrying at least one sequence of at least one instruction to processor 1304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1300 can receive the data on the communication link and convert the data to a format that can be read by computer system 1300. For instance, a receiver such as a radio frequency antenna or an infrared detector can receive the data carried in a wireless or optical signal and appropriate circuitry can provide the data to I/O subsystem 1302 such as place the data on a bus. I/O subsystem 1302 carries the data to memory 1306, from which processor 1304 retrieves and executes the instructions. The instructions received by memory 1306 may optionally be stored on storage 1310 either before or after execution by processor 1304.

Computer system 1300 also includes a communication interface 1318 coupled to I/O subsystem 1302. Communication interface 1318 provides a two-way data communication coupling to network link(s) 1320 that are directly or indirectly connected to at least one communication networks, such as a network 1322 or a public or private cloud on the Internet. For example, communication interface 1318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1322 broadly represents a local area network (LAN), wide-area network (WAN), campus network, internetwork or any combination thereof. Communication interface 1318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1318 sends and receives electrical, electromagnetic or optical signals over signal paths that carry digital data streams representing various types of information.

Network link 1320 typically provides electrical, electromagnetic, or optical data communication directly or through at least one network to other data devices, using, for example, satellite, cellular, Wi-Fi, or BLUETOOTH technology. For example, network link 1320 may provide a connection through a network 1322 to a host 1324.

Furthermore, network link 1320 may provide a connection through network 1322 or to other computing devices via internetworking devices and/or computers that are operated by an Internet Service Provider (ISP) 1326. ISP 1326 provides data communication services through a world-wide packet data communication network represented as internet 1328. A server 1330 may be coupled to internet 1328. Server 1330 broadly represents any computer, data center, virtual machine or virtual computing instance with or without a hypervisor, or computer executing a containerized program system such as DOCKER or KUBERNETES. Server 1330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1300 and server 1330 may form elements of a distributed computing system that includes other computers, a processing cluster, server farm or other organization of computers that cooperate to perform tasks or execute applications or services. Server 1330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; client interface instructions to render or interpret commands for a graphical user interface (GUI), command-line interface or text client interface; application software such as an office suite, internet access applications, design and manufacturing applications, graphics applications, audio applications, software engineering applications, educational applications, games or miscellaneous applications. Server 1330 may comprise a web application server that hosts a presentation layer, application layer and data storage layer such as a relational database system using structured query language (SQL) or no SQL, an object store, a graph database, a flat file system or other data storage.

Computer system 1300 can send messages and receive data and instructions, including program code, through the network(s), network link 1320 and communication interface 1318. In the Internet example, a server 1330 might transmit a requested code for an application program through Internet 1328, ISP 1326, local network 1322 and communication interface 1318. The received code may be executed by processor 1304 as it is received, and/or stored in storage 1310, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1304. While each processor 1304 or core of the processor executes a single task at a time, computer system 1300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive client applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
using a first computer, generating and transmitting to a second computer, one or more first presentation instructions which when rendered using the second computer cause displaying one or more machine-generated messages of a conversational assistant in a first window of a graphical user interface (GUI) of the second computer, and cause displaying at least one other GUI element in the GUI, the conversational assistant being programmed to control, according to a programmed workflow, presentation of the first window and the at least one other GUI element;
using the first computer, receiving, via the first window, input from the second computer comprising one or more comments in a human natural language;
in response to receiving the input, translating, by a natural-language model of a conversational assistant system, the input into a corresponding intent and retrieving, from a conversational knowledge graph, a context of the corresponding intent;
using the first computer, processing the one or more comments of the input to determine a task responsive to the one or more comments, and based on the task, generating and transmitting to the second computer, one or more second presentation instructions which when rendered using the second computer cause updating one or more of the first window and the other GUI element;
repeating the generating, transmitting, receiving, processing, and updating steps to control the first window and the other GUI element based on a programmed workflow that is digitally stored at the first computer.

2. The method of claim 1, the first presentation instructions specifying a prompt to a user to set a goal.

3. The method of claim 1, the second presentation instructions specifying a request to enter a plurality of comments or tags.

4. The method of claim 1, the updating comprising replacing the first window with the other GUI element.

5. The method of claim 4, the repeating comprising restoring the conversational assistant to the first window.

6. The method of claim 1, further comprising:
suspending the workflow and storing the input in association with metadata describing the workflow;
generating a summary of the metadata describing the workflow;
automatically transmitting final presentation instructions to a client computing device, which when rendered via the client computing device, cause displaying the summary of the metadata describing the workflow.

7. The method of claim 1, the first presentation instructions causing displaying plurality of selectable options, and the method further comprising:
determining a threshold corresponding to the input from the second computer selecting one of the plurality of selectable options;
in response to determining that the input satisfies the threshold, generating the second presentation instructions to enable one or more second selectable options for suspending the workflow.

8. The method of claim 1, further comprising:
generating a natural-language response at the second computer.

9. The method of claim 1, the input comprising a plurality of comments corresponding to a video recording that is displayed in the other GUI element, each comment of the plurality of comments corresponding to one or more time values related to the video recording.

10. The method of claim 1, wherein displaying at least one GUI element comprises executing code received through a network.

11. A computer system, comprising:
one or more hardware processors;
one or more non-transitory computer-readable storage media storing one or more sequences of instructions which, when executed using the one or more hardware processors, cause the processors to execute:
using a first computer, generating and transmitting to a second computer, one or more first presentation instructions which when rendered using the second computer cause displaying one or more machine-generated messages of a conversational assistant in a first window of a graphical user interface (GUI) of the second computer, and cause displaying at least one other GUI element in the GUI, the conversational assistant being programmed to control, according to a programmed workflow, presentation of the first window and the at least one other GUI element;
using the first computer, receiving, via the first window, input from the second computer comprising one or more comments in a human natural language;
in response to receiving the input, translating, by a natural-language model of a conversational assistant system, the input into a corresponding intent and retrieving, from a conversational knowledge graph, a context of the corresponding intent;
using the first computer, processing the one or more comments of the input to determine a task responsive to the one or more comments, and based on the task, generating and transmitting to the second computer, one or more second presentation instructions which when rendered using the second computer cause updating one or more of the first window and the other GUI element;
repeating the generating, transmitting, receiving, processing, and updating steps to control the first window and the other GUI element based on a programmed workflow that is digitally stored at the first computer.

12. The computer system of claim 11, the first presentation instructions specifying a prompt to a user to set a goal.

13. The computer system of claim 11, the second presentation instructions specifying a request to enter a plurality of comments or tags.

14. The computer system of claim 11, the instructions for updating comprising one or more sequences of instructions which, when executed using the one or more hardware processors, cause the processors to execute replacing the first window with the other GUI element.

15. The computer system of claim 14, the instructions for repeating comprising one or more sequences of instructions which, when executed using the one or more hardware processors, cause the processors to execute restoring the conversational assistant to the first window.

16. The computer system of claim 11, further comprising one or more sequences of instructions which, when executed using the one or more hardware processors, cause the processors to execute:
  suspending the workflow and storing the input in association with metadata describing the workflow;
  generating a summary of the metadata describing the workflow;
  automatically transmitting final presentation instructions to a client computing device, which when rendered via the client computing device, cause displaying the summary of the metadata describing the workflow.

17. The computer system of claim 11, the first presentation instructions causing displaying a plurality of selectable options, and the computer system further comprising one or more sequences of instructions which, when executed using the one or more hardware processors, cause the processors to execute:
  determining a threshold corresponding to the input from the second computer selecting one of the plurality of selectable options;
  in response to determining that the input satisfies the threshold, generating the second presentation instructions to enable one or more second selectable options for suspending the workflow.

18. The computer system of claim 11, further comprising one or more sequences of instructions which, when executed using the one or more hardware processors, cause the processors to execute:
  generating a natural-language response at the second computer.

19. The computer system of claim 11, the input comprising a plurality of comments corresponding to a video recording that is displayed in the other GUI element, each comment of the plurality of comments corresponding to one or more time values related to the video recording.

20. The computer system of claim 11, wherein displaying at least one GUI element comprises executing code received through a network.

21. A computer-implemented method comprising:
  using a first computer, generating and transmitting to a second computer, one or more first output instructions which when processed using the second computer cause communicating one or more machine-generated messages of a conversational assistant;
  using the first computer, receiving input from the second computer comprising one or more comments in a human natural language;
  in response to receiving the input, translating, by a natural-language model of a conversational assistant system, the input into a corresponding intent and retrieving, from a conversational knowledge graph, a context of the corresponding intent;
  using the first computer, processing the one or more comments of the input to determine a task responsive to the one or more comments, and based on the task, generating and transmitting to the second computer, one or more second output instructions which when processed using the second computer cause updating at least one graphical user interface, GUI, interface (GUI) element in a first window of the second computer, wherein the conversational assistant is programmed to control, according to a programmed workflow, presentation of a first window and at least one other GUI element;
  repeating the generating, transmitting, receiving, processing, and updating steps to control the first window and the GUI element based on a programmed workflow that is digitally stored at the first computer.

22. The method of claim 21, the first output instructions specifying a prompt to a user to set a goal.

23. The method of claim 21, the updating comprising replacing the first window with the GUI element.

24. The method of claim 23, the repeating comprising restoring the conversational assistant to the first window.

25. The method of claim 21, further comprising:
  suspending the workflow and storing the input in association with metadata describing the workflow;
  generating a summary of the metadata describing the workflow;
  automatically transmitting final output instructions to a client computing device, which when rendered via the client computing device, cause displaying the summary of the metadata describing the workflow.

26. The method of claim 21, the first output instructions causing displaying plurality of selectable options, and the method further comprising:
  determining a threshold corresponding to the input from the second computer selecting one of the plurality of selectable options;
  in response to determining that the input satisfies the threshold, generating the second output instructions to enable one or more second selectable options for suspending the workflow.

27. The method of claim 21, further comprising:
  generating a natural-language response at the second computer.

28. The method of claim 21, the input comprising auditory comments in a human natural language.

29. The method of claim 21, the first output comprising one or more auditory messages in a human natural language.

30. The method of claim 21, wherein updating at least one GUI element in the first window of the second computer comprises executing code received through a network.

31. A computer-implemented method comprising:
  using a first computer, generating and transmitting to a second computer, one or more first presentation instructions which when rendered using the second computer cause displaying one or more machine-generated messages of a conversational assistant in a first window of a graphical user interface (GUI) of the second computer, and cause displaying at least one other GUI element in the GUI;
  using the first presentation instructions, displaying a plurality of selectable options;
  using the first computer, receiving, via the first window, a first input from the second computer comprising one or more comments in a human natural language and a second input from the second computer comprising a selection of one or more of the selectable options;
  using the first computer, processing the one or more comments of the first input and the selection of one or more of the selectable options of the second input to determine a goal and/or intention of the first input and second input;
  based at least in part on the goal and/or the intention, determining a task responsive to the first input and the second input, and based on the task, generating and transmitting to the second computer, one or more second presentation instructions which when rendered using the second computer cause updating one or more of the first window and the other GUI element; and
  repeating the generating, transmitting, receiving, processing, and updating steps to control the first window and the other GUI element based on a programmed workflow that is digitally stored at the first computer.

32. A computer-implemented method comprising:

receiving at a first computer a first input from a second computer, wherein the first input is written in a natural language, and wherein the first input is entered into a first window of the second computer;

generating a first response in the natural language from the first computer responsive to the first input, wherein the first response includes a request for a second input, and wherein the first computer at least partially obstructs functionality of a second window until the first computer receives the second input;

displaying the first response in the first window of the second computer;

displaying a graphical user interface (GUI) in the second window of the second computer;

receiving a second input in the second window, wherein the second input comprises one or more selections from and/or interactions with the GUI of the second window;

generating at the first computer an update to the GUI and a second response in the natural language responsive to the second input;

displaying an updated version of the GUI at the second computer; and displaying the second response in the first window of the second computer.

33. The computer-implemented method of claim 32, wherein the second window is a video window.

34. The computer-implemented method of claim 32, wherein displaying a GUI in the second window of the second computer comprises executing code received through a network.

* * * * *